(12) United States Patent
Li et al.

(10) Patent No.: US 11,212,188 B2
(45) Date of Patent: Dec. 28, 2021

(54) COMMUNICATION NETWORK OUT-OF-CAPACITY PREDICTIONS

(71) Applicant: Facebook, Inc., Menlo Park, CA (US)

(72) Inventors: Ying Li, Menlo Park, CA (US);
Martinus Arnold de Jongh, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 36 days.

(21) Appl. No.: 16/784,903

(22) Filed: Feb. 7, 2020

(65) Prior Publication Data
US 2021/0250245 A1    Aug. 12, 2021

(51) Int. Cl.
*G06F 15/173* (2006.01)
*H04L 12/24* (2006.01)
*H04L 12/26* (2006.01)

(52) U.S. Cl.
CPC ........ *H04L 41/147* (2013.01); *H04L 41/0823* (2013.01); *H04L 41/145* (2013.01); *H04L 43/04* (2013.01); *H04L 43/062* (2013.01); *H04L 43/065* (2013.01); *H04L 43/0876* (2013.01); *H04L 43/16* (2013.01)

(58) Field of Classification Search
CPC . H04L 41/147; H04L 41/0823; H04L 41/145; H04L 43/04; H04L 43/062; H04L 43/065; H04L 43/0876; H04L 43/16
USPC .................................. 709/223–226
See application file for complete search history.

(56) References Cited

U.S. PATENT DOCUMENTS

| | | | |
|---|---|---|---|
| 2012/0057503 A1* | 3/2012 | Ding ...................... | H04W 24/02 370/254 |
| 2014/0313901 A1* | 10/2014 | Yacovitch ......... | H04W 72/0433 370/236 |
| 2017/0150222 A1* | 5/2017 | Kim .................... | H04N 21/4312 |
| 2020/0304393 A1* | 9/2020 | Sampath .............. | H04L 41/147 |
| 2020/0336923 A1* | 10/2020 | Li ......................... | H04W 4/021 |

FOREIGN PATENT DOCUMENTS

| | | |
|---|---|---|
| EP | 2530870 A1 | 12/2012 |
| EP | 3442305 A1 | 2/2019 |
| EP | 3598721 A1 | 1/2020 |

OTHER PUBLICATIONS

Extended European search report for Application No. 21150627.4-1218, dated Jun. 22, 2021, 8 pages.

* cited by examiner

*Primary Examiner* — Duyen M Doan
(74) *Attorney, Agent, or Firm* — Baker Botts L.L.P.

(57) ABSTRACT

In one embodiment, a computing system may access data samples associated with an access point of a communication network. The data samples may be collected at an application level from client devices associated with the access point and aggregated into data points correlating a first network metric to a traffic-volume metric. The system may partition the data points into a first and second set of data points using a first network metric threshold. The system may determine trends of the traffic-volume metric with respect to the first network metric based on regression analysis on the first and second sets of data points. The system may predict, based on the trends of the traffic-volume metric with respect to the first network metric, an amount of time until a network-capacity metric of the access point meets a traffic-loss threshold. The network-capacity metric may be determined based on the traffic-volume metric.

20 Claims, 10 Drawing Sheets

| Access Point Identifier | Predicted Number of Weeks for Out of Capacity | Number of Samples |
|---|---|---|
| A1 | 0.17987501 | 7514 |
| A2 | 1.48549259 | 2065 |
| A3 | 1.84113996 | 3900 |
| A4 | 2.99375845 | 1497 |
| A5 | 4.275573701 | 2965 |
| A6 | 4.90858665 | 14426 |
| A7 | 5.08268315 | 5691 |
| A8 | 5.34959288 | 8724 |
| A9 | 6.36959347 | 8042 |
| A10 | 6.59927986 | 32674 |
| A11 | 7.08539317 | 3901 |
| A12 | 7.107946 | 2724 |

COMMUNICATION NETWORK OUT-OF-CAPACITY PREDICTIONS

TECHNICAL FIELD

This disclosure generally relates to communication network, and in particular, to optimizing communication network based on predicted amount of time for out of capacity.

BACKGROUND

Communication networks, such as fiber-optic networks, cellular networks, and broadband wireless networks, provide data communication channels for computing systems (e.g., a computer, a tablet, a smartphone) to communicate data and information, such as, text, images, videos, website content, etc. A geographic area covered by a communication network may be divided into a number of sub-areas (e.g., tiles, cells in cellular networks, regions such as a county, an area of a collection of cities, towns, village, etc.). Each sub-area may generate certain amount of network traffic and the communication network may provide connection services to any number sub-areas covered by the communication network. Users may access the communication network (e.g., using a computing device) for downloading and uploading data. The communication network may have a bandwidth to allow the users to use services supported by the communication network.

SUMMARY OF PARTICULAR EMBODIMENTS

Particular embodiments described here relate to a method of predicting the amount of time until an access point of a communication network is out of capacity based on network performance data collected at the application level. The system may first collect network performance data at the application level over a period of time (e.g., W weeks) and aggregate the collected data samples into a series of data points. Each data point may be aggregated based on data samples of the same hour of one week (e.g., each data point having a network traffic value of one hour aggregated over one week). Then, the system may use number of sample thresholds to split the aggregated data points into at least two data point sets (e.g., a first data set with low number of samples and a second data set with high number of samples). Then, the system may perform regression analysis (e.g., linear regression, non-linear regression, or a combination of linear and non-linear regression) on these data sets to determine the corresponding regression functions (e.g., which may correlate number of samples to network traffic). After that, the system may determine, for a given percentage of total traffic loss, the corresponding increased number of samples based on the regression results of the data points. The system may determine an increasing speed of the number of samples based on a mid- or long-term trend of the number of samples over a mid- or long-term time period (e.g., 1 year). Then, the system may determine the predicted amount of time (e.g., a time period from current time to a future time point) that the access point will have a total network traffic loss equal to or greater than the given percentage of total traffic loss. The system may monitor a number of access points and predict the time for out of capacity for each of the monitored access points. Then, the system may generate one or more alerts to flag the access points that are predicted to be out of capacity within certain amount of time. The system may generate prioritized recommendations for MNOs (mobile network operators) to optimize access points of the communication network based on the respective predicted time amounts for these access points to become out of capacity.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 illustrates example access points with predicted number of weeks for out of capacity.

DESCRIPTION OF EXAMPLE EMBODIMENTS

Overview

Figure 1:
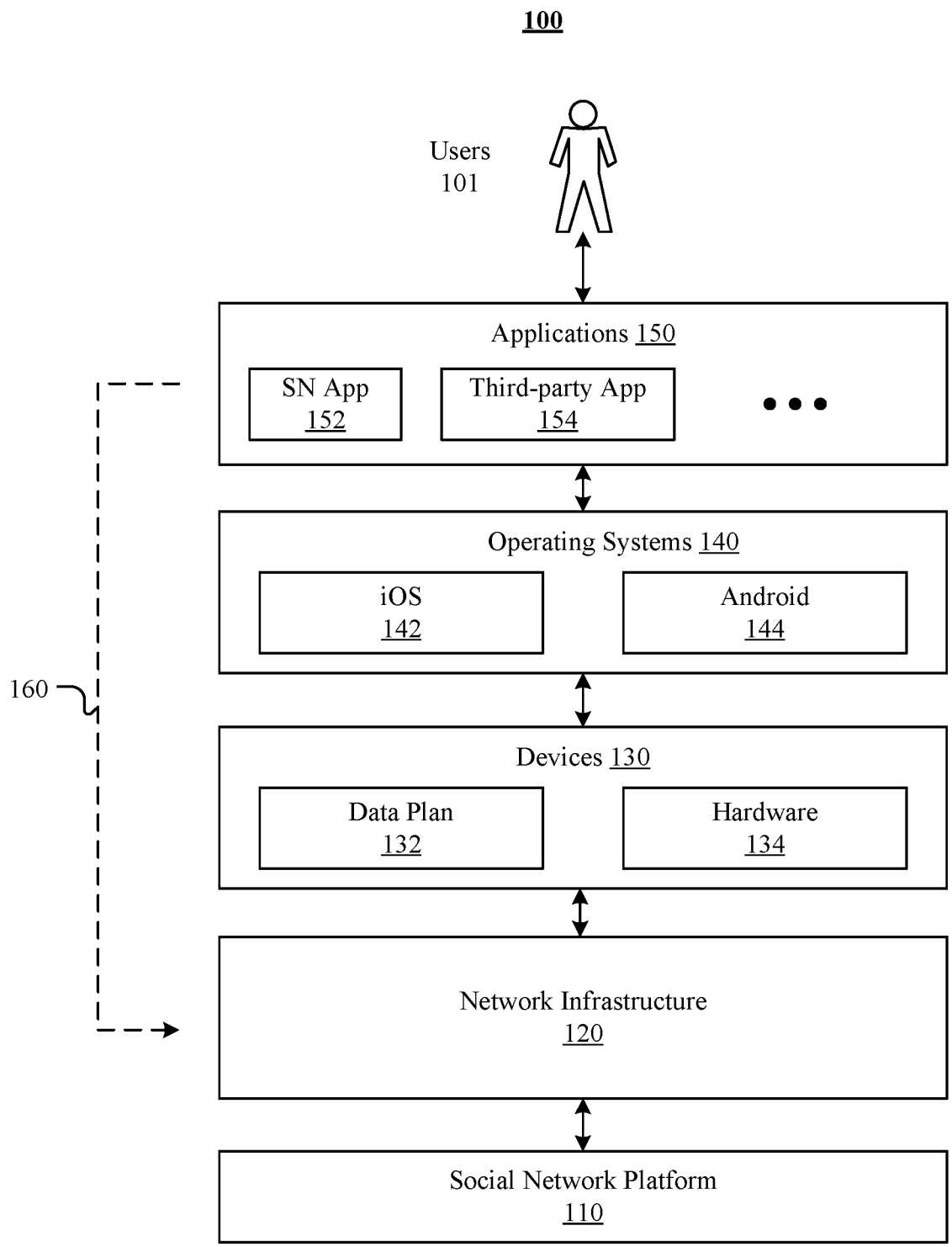
FIG. 1 illustrates an example system for optimizing network infrastructure based on data collected at application level.

Traditional technologies and systems for optimizing communication networks may monitor network traffic of cellular towers (e.g., 100 k) at network infrastructure level. For example, the systems may include instrumentations carried by a measurement vehicle driving around in the network for measuring network performance. However, these technologies and systems are very inefficient and limited in capability. For example, they cannot detect network capacity problems for the large number of cells of cellular networks. The network optimization that only relies on network infrastructure level information has many shortcomings which could lead to suboptimal results. For example, traditional systems cannot predict the time when a cell will be out of capacity. Traditional cell enhancement or optimization (e.g., upgrading, adding cells) may be performed in a non-optimal order without considering when the cells will be out of capacity.

Particular embodiments of the system may use the data (e.g., application names, application types, time duration, quality of experience, network speed, latency, network coverage, network traffic volume, number of samples, etc.) collected at the application level to generate models for identifying the cells that have network capacity issues or are predicted to have network capacity issue in a future time. The system may collect data samples associated with a cell of interest and aggregate the collected data samples into a series of data points. The system may use regression analysis on the data points to determine the trends of one or more network metrics. Then, the system may predict, based on the trends of the network metrics, the amount of time until that cell is out of capacity. The system may monitor a number of cells and predict the time for out of capacity for each of the monitored cells. The system may determine a priority for each monitored cell based on the predicted time of out of capacity of the cell. The system may generate cell optimization recommendations for MNOs (mobile network operators) based on the determined priorities.

Particular embodiments of the system address the limitations and shortcomings of existing network optimization technologies and systems by providing technological solutions for monitoring, evaluating, predicting, and optimizing the communication network performance. Particular embodiments of the system may optimize the communication (e.g., infrastructure level, application level) based on information from both the infrastructure level and application level, and therefore help to improve network performance. Particular embodiments of the system may provide more effective network optimization recommendations with more optimized priorities for improving the network performance. For example, the system may provide network optimization recommendations on whether to optimize the network in particular cells, which aspects to optimize for (e.g., network upgrading, network expansion, adding more cells, cell densification), where and when to implement the optimization (e.g., where and when to add cells for cell densification), etc. Particular embodiments of the system may identify cells that are predicted to have network capacity issues in future. Particular embodiments of the system may enable more effective network optimization or enchantment (e.g., by upgrading capacity, adding cells, adding fiber links) and provide better QoE (e.g., higher network speed, less network traffic, less network latency) to end users of the networks. The system may help to reduce the operating expense (OPEX) (e.g., via reducing the complaints, tickets, lowering the network optimization cost), reduce the CAPEX (e.g., via most effectively pinpoint out where to add more cells and avoid adding cells in non-needed places), and recover or boost the network traffic volume which would have been suppressed due to unsatisfied QoE.

System for Optimizing Network Infrastructure Based on Application Level Data

FIG. 1 illustrates an example system 100 for optimizing network infrastructure based on data collected at application level. In particular embodiments, the system 100 may include a number of layers including, for example, a social network platform 110 (e.g., servers, databases), network infrastructure 120 (e.g., fiber networks, cellular towers, cable networks, switches), computing devices 130 (e.g., client devices, computers, smartphones, tablets), operating systems 140 (e.g., iOS 142, android 144), applications 150 (e.g., social network applications 152, third-party applications 154, operators' applications, carriers' applications or any suitable applications), users 101, etc. The social network platform 110 may provide content and services to users 101 through the network infrastructure 120 and the computing devices 130. The computing devices 130 may include device hardware 134 (e.g., computers, smartphones, tablets) and may be associated with particular data plans 132 provided by one or more carriers. The computing devices 140 may include an operating system (e.g., iOS 142, android 144) and a number of applications 150 (e.g., social network applications 152, third-party applications 154) running on the computing devices 130. The users 101 may interact with the applications 150 running on the computing devices 130 to access the content and services provided by the social network platform 110. In particular embodiments, the system 100 may collect data (e.g., application names, application types, time duration, quality of experience, network speed, latency, network traffic, total amount of data delivered, number of samples, signal strength, number of connected towers, signal stability status, network coverage, etc.) from the applications 150 running on the computing devices 130 used by the users 101. The system 100 may collect the application data through one or more application programming interfaces (APIs) provided by the social network platform 110 or third-parity entities (e.g., network carriers, operating system providers, application developers, application service providers). The system 100 may use the data collected at the application level for monitoring the network performance, such as, detecting network capacity or coverage problems. The system 100 may provide network insights 160 (e.g., congested areas, congest alerts, coverage alerts, network traffic, network speeds, network latency, number of samples, network performance, etc.) based on the collected application data for the optimization of network infrastructure 120. The system 100 may monitor a number of access points (e.g., cells) of one or more communication networks and predict the time when the monitored cells will be out of capacity. The system 100 may determine a priority for each monitored cell and generate optimization recommendations for the network infrastructure 120 (e.g., upgrading cellular technologies, adding cells) based on these priorities.

In particular embodiments, the system 100 may monitor the communication network performance (e.g., network traffic, number of samples, network coverage issues) based on the data from both front-end (e.g., client devices 130, applications 150, operating system 140, websites, search engines, etc.) and back-end (e.g., social network platform 110, network infrastructure 120, servers, switches, database, etc.) of the communication network. In particular embodiments, the system 100 may collect user experience data (e.g., network traffic, number of samples, number of requests, network speeds, network latency, signal stability status) from both front-end and back-end of the communication network. In particular embodiments, the system 100 may use the data collected from the front-end (e.g., applications) to generate optimization recommendations (e.g., upgrading networks, adding cells) for the back-end network infrastructures 120 or/and social network platform 110. In particular embodiments, the system 100 may use the data collected from the back-end (e.g., social network platform 110, network infrastructure 120) to generate optimization recommendations for the front-end user experience (e.g., applications 150, operating system 140, client devices 130, data plan 132, network speeds, latency, etc.). In particular embodiments, the system 100 may determine one or more network performance metrics (e.g., network traffic, network speed, number of samples) and use these network performance metrics to detect or predict network capacity problems (e.g., out of capacity) in one or more access points of the communication network.

In this disclosure, network data, network performance data, network related data, or network data samples, may refer to the data samples related to the communication network. Each data sample may correspond to a recorded network request and the data samples may be collected via the application layer 150. In this disclosure, the term "network traffic" or "traffic" may refer to "network traffic volume" associated with one or more access points of one or more communication networks during an associated time window. It is notable that, in this disclosure, although the cells of cellular communication networks are used for example purpose, the methods, processes, and principles as described in this disclosure are not limited thereto. The methods, processes, and principles as described in this disclosure may be applicable to any access points of any types of communication networks.

Figure 2:
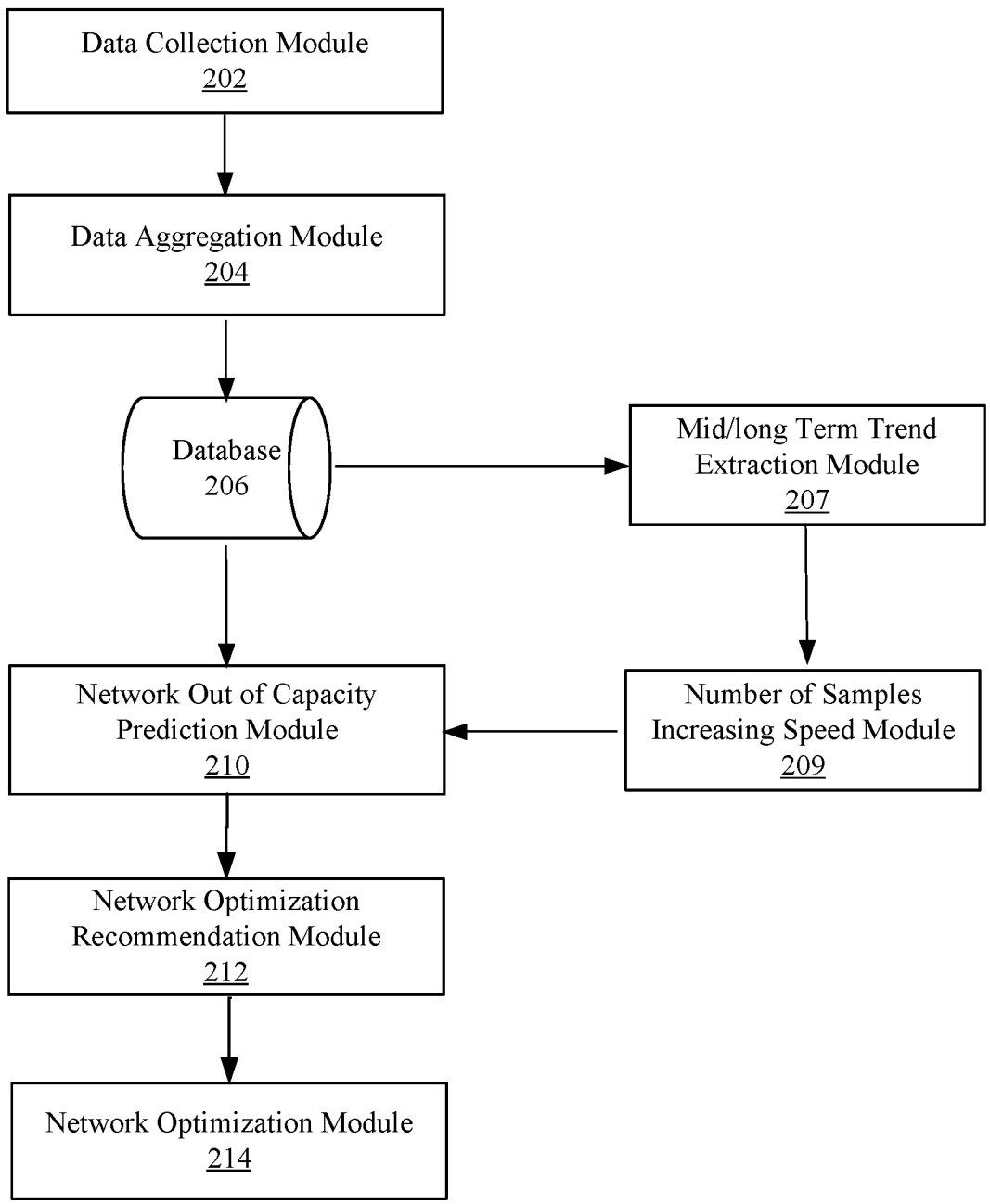
FIG. 2 illustrates an example framework for optimizing communication network infrastructure based on predicted time for out of capacity.

Framework for Optimizing Network Infrastructure Based on Predicted Out of Capacity Time FIG. 2 illustrates an example framework 200 for optimizing communication network infrastructure based on predicted time for out of capacity. In particular embodiments, the framework 200 may be implemented on the social network platform 110 (e.g., social network servers), third-party platforms (e.g., third-parity servers), or any computing systems that may coordinate with the network infrastructure 120 and client devices 130 to collect data at the application level and predict the time for access points to be out of capacity. In particular embodiments, the framework 200 may include a data collection module 202, a data aggregation module 204, a database 206, a mid/long-term trend extraction module 207, a number of samples prediction module 209, a network out of capacity prediction module 210, a network optimization recommendation module 212, a network optimization module 214, etc. In particular embodiments, the data collection module 202 may collect data at the application level from a number of computing devices (e.g., via APIs). Then, the collected data may be preprocessed and aggregated by the data aggregation module 204 into a series of data points (e.g., aggregated per hour per week or per hour per any number of days). The aggregated data may be stored in the database 206 and fed to the network out of capacity prediction module 210. In particular embodiments, the data may be aggregated at cell level for a cellular communication network. The aggregated data may be associated with corresponding cells as identified by the cell identifiers. The system may the data associated with a cell to predict when that cell will be out of capacity. For example, the network out of capacity prediction module 210 may access data associated with the cells of a communication network from the database 206 and predict the time when these cells will be out of capacity.

In particular embodiments, the system may use the mid/long-term trend extraction module 207 to determine the trends of one or more network parameters (e.g., network speed, network traffic, number of samples) over time. For example, the system may perform regression analysis on the historical data over a year or multiple years to determine the mid/long-term trends of the number of samples over time. Then, the system may use the number of samples increasing speed module 209 to determine the increasing speed of number of samples over time based on the mid/long-term trends of the number of samples. After that, the network out of capacity prediction module 210 may predict, for each monitored cell, when that cell will be out of capacity based on the increasing speed of the number of samples. For example, the network out of capacity prediction module 210 may determine the increased number of samples (e.g., in absolute numbers or in percentages) that will cause a cell to be out of capacity (e.g., having total network traffic loss equal to or greater than X %). Then, the system may determine the period of time after which the out capacity will happen based on the increased number of samples and the increasing speed of the number of samples over time. The system may monitor a number of cells and determine when these cells will be out of capacity. Then, the system may determine priorities for the monitored cells based on the predicted time for these cells to be out of capacity. After that, the system may use the network optimization recommendation module 212 may generate one or more network optimization recommendations based on the priorities of these cells. The network optimization module 214 may implement one or more network optimization operations based on one or more network optimization recommendations generated by the network optimization recommendation module 212.

Network Out of Capacity Prediction

Quality of Experience

Quality of experience (QoE) of end users or customers may be a general metric to indicate the degree of satisfactory of end users related to experiences (e.g., applications, connection services) related to a communication network. For example, QoE may be based on one or more parameters associated with end users experience at the mobile application level (e.g., download speed, network latency, network traffic, network congestion, etc.). QoE may also be based on a metric derived from (e.g., by a mapping function) one or more network parameters (e.g., download speed, network traffic, latency, number of samples, etc.). QoE may be one of the most important factors for communication network planning, monitoring, diagnosis, or/and optimization. In particular embodiments, QoE may include or depend on one or more network performance parameters related to end user experiences at the mobile application level (e.g., network traffic, number of samples, download speeds, network latency, congestion metric indicating the congestion level, video watching experience related indicators such as jitter, buffering time, freeze up time duration, freeze up time ratio against the watch time, etc.). QoE may be used in network monitoring, diagnosis, optimization, and network planning to provide useful information to the mobile network operators (MNOs). The QoE may be used to reduce the OPEX (e.g., by reducing the complaints, tickets, lowering the network optimization cost), reduce the CAPEX (e.g., by effectively pinpointing out where to add more cells and void adding cells in non-needed places). QoE may be used to help MNOs to recover or boost the traffic volume (and generate more revenue), which would have been suppressed by end users due to unsatisfied QoE. Beside QoE, network insights determined based on QoE may link the QoE to wireless network engineering and provide inputs to MNOs to make decisions on a number of issues, such as, whether to optimize the network, which aspect to optimize for, whether to upgrade the network from current generation to next generation, whether to expand the network (e.g., by adding more cells, or cell densification), where to add cells, etc. The MNOs may use QoE information to recover or boost the traffic volume with more revenue, which would have been suppressed due to unsatisfied QoE.

Out of Capacity

In particular embodiments, the system may use one or more pre-determined conditions to identify access points that are out of capacity. The out of capacity state of an access point may be specified by a total traffic loss percentage X %. The system may use the total network traffic loss percentage X % to determine whether or not an access point is in the out of capacity state. An access point of a communication network may be out of capacity if its total network traffic (of a pre-determined time window) of the access point as determined by regression based on data with higher numbers of samples (e.g., higher than a threshold) is X % lower than the total network traffic as determined by regression (or observation data) based on data of lower numbers of samples (e.g., lower than a threshold). For the access points that are not currently out of capacity, the system may predict how many weeks the number of samples until this access point has X % total traffic loss (e.g., X %=5%, 10%, 15%, 20%). The system may determine a mid- or long-term trends of the number of samples for determining the increasing speed of the number of samples (e.g., number of samples increase percentage per week). The mid- or long-term (e.g., 1 year or multiple years) trends may be determined based on historical data of a mid- or long-term time period (e.g., 1 year or multiple years). The system may determine the increased number of samples that will cause the access point to be out of capacity (e.g., having a X % total traffic loss) and determine the predicted time when that will happen based on the increased number samples and the increasing speed of number of samples (as determined based on the mid- or long-term trends).

In particular embodiments, for improving robustness of the results, the system may use multiple levels of related parameters to predict the time when the access points will be out of capacity. For example, the system may use a combination of different thresholds for splitting the data points for regression purpose and different lengths of time windows during which the related parameters are determined. The predicted time for out of capacity may be used for prioritizing network planning, for example, prioritizing whether or/and where to upgrade the communication network from current generation to next generation, whether or/and where to expand the network (e.g., adding cells), etc. It is notable that although cells of cellular communication networks may be used in this disclosure as examples, the out of capacity prediction is not limited to the cells of cellular communication networks. In particular embodiments, the system may predict the time for out of capacity for any access points of any types of communication networks including, for example, but not limited to, access points using cellular technologies such as 2G/3G/4G/5G, access points using non-cellular technologies such as WiFi, WiMax, Bluetooth, Visible Light Communications (VLC), etc.

Data Collection

In particular embodiments, the system may collect the network performance data of one or more communication networks at the application level (e.g., based on social network applications, network operator applications, carrier applications, third-party applications, etc.) or/and infrastructure level (e.g., servers, routers, cell towers, network instrumentations, etc.). The data collected by the system may include network performance information related to QoE as experienced by application users (e.g., network traffic, network speed, number of samples, latency, network coverage, etc.) connected by the communication network. The collected data may be collected from client devices associated with one or more access points of one or more communication networks. The raw application data may be logged based on requests from applications together with the time stamp associated which each application request.

In particular embodiments, the collected data may include identifiers of the access points (e.g., cell identifiers of cellular communication networks) that are serving the client devices and the applications. The collected data may also include, for example, but is not limited to, location information of client devices (e.g., via APIs when user approves and enables location-based services of the devices), carrier information (e.g., network providers), etc. The access point identifier of each access point may uniquely identify that access point and contain concatenated information such as air interface technology type information. The collected data may include the counters related to the total bits of information delivered and the time spent for delivery of that information. The collected data may be used to determine one or more network performance metrics. For example, the system may determine the network traffic of a particular period of time based on the counters of the total bits of the information of during that time period. As another example, the system may determine the download speed of the network based on the total bits of information delivered and the corresponding time spent for delivery of that information.

In particular embodiments, the client devices may communicate with the social network platform through internet connections. For example, the client devices may send communication requests to and receive data from the social network platform back and force. In particular embodiments, the system may sample the requests with a particular sampling rate (e.g., one sample per one hundred samples). The system may record information related to the number of devices that are connected, the number of connecting requests, the time required for the requests to be received by the social network platform, the amount of data that the social network platform transmit to and receive from the client devices, the time spent in transmitting data to and receiving data from the client devices, etc. The system may determine, based on the collected data, a number of network parameters including, for example, network traffic, number of samples, network speeds (e.g., dividing the total bits by the time spent), access point identifiers (e.g., cell identifiers), carrier information (e.g., carrier names, technology generations), types of client devices, application information (e.g., names, versions), etc. The data may be continuously collected at the application level and may be periodically (e.g., daily or every several days) sent back to the social network platform for storage. The system may store the collected information in a database and may run an information processing pipeline for monitoring the network performance.

Data Aggregation

In particular embodiments, the system may associate the collected data to corresponding access points of the communication network based on the access point identifiers associated with collected data. The system may aggregate the collected data into a series of data points per hour per week (over time or over any related network metrics). The aggregated data points may be time-series data including a number of data points with each data point being aggregated per hour and per week. The aggregated data points may correlate one network metric to another network metric (e.g., network traffic to number of samples, network speed to number of samples, number of samples to time, etc.) As an example and not by way of limitation, the system may associate the collected data of a cellular communication network to corresponding cells of the cellular communication network based on the cell identifier associated with the collected data. Then, the system may aggregate the collected data samples into data points for all data samples related to all the devices that are served by the same cell. The data aggregation may be performed in the time dimension or with respect to a related network metric (e.g., number of samples). It is notable that the data aggregation per hour per week is for example purpose only and the data aggregation is not limited thereto. For example, the data aggregation may be per hour per each individual day. As another example, the data aggregation may be per hour per week. As yet another example, the data aggregation may be per hour all days of a duration of any number of days. The system may calculate the network metrics or parameters (e.g., number of samples, network traffic volume, network speed, and number of samples, etc.) based on the aggregated data (e.g., data of every hour for each individual day, data of every hour for each week, or data of every hour for a duration of N days (e.g., 7 days, 14 days, 28 days)).

In particular embodiments, the aggregated data points may be a series of data points over time with each data point being aggregated per hour and per week. As an example and not by way of limitation, a series of aggregated data points covering a six-week time window may include 144 data points (e.g., 24×6=72 data points) with each data point aggregated over each hour and one week. Each data point may include information related to aggregated total network traffic (e.g., in the units of bits, bytes, Mbits, Mbytes, etc.) and aggregated total number of samples (from which the aggregated total traffic may be derived from). In particular embodiments, the aggregated data points may be a series of data points correlating one network metric (e.g., network traffic, network speed) to another network metric (e.g., number of samples). As an example, the aggregated data points may be a series of network traffic data points over the number of samples and may be used for determining network traffic trend using regression. As another example, the aggregated data points may be a series of network speed data points over the number of samples and may be used for determining network speed trend using regression. It is notable that "data point" and "data sample" have different meanings in this disclosure. Data points which are used in regression, may each be an aggregation of multiple data samples, which may be the raw data samples or the raw connecting requests that are logged. For example, a data point may include 1000 data samples for a particular hour over a week aggregation and may correspond to 4×1E7 bytes of total traffic of these samples. Each sample may correspond to a request from an application used by an end user.

Regression on Multiple Data Sets

In particular embodiments, the system may determine trends of one or more network metrics with respect to other network metrics using regression analysis on the aggregated data points (e.g., a network traffic trend with respect to the number of samples, a network speed trend with respect to the number of samples, a number of sample trend with respect to time, etc.). In particular embodiments, the system may perform regression analysis for one network metric over an independent variable (IV). For example, the system may a regression function $y=f(x)$, where y may be the dependent variable (DV) and x may be the independent variable (IV). The system may use the regression function $y=f(x)$ to determine a trend of a network metric over a correlated parameter (e.g., network speed over number of samples, network traffic over number of samples, number of samples over time, etc.). In particular embodiments, the system may perform regression on multiple parameters by extending the regression of one parameter to a vector or a combination of multiple parameters. For example, for the regression function $y=f(x)$, the independent variable (IV) x may be a vector or a combination of multiple parameters (e.g., number of samples, network traffic, network speed, signal strength, time, distribution of packet sizes, etc.).

As an example and not by way of limitation, given W weeks data points aggregated per hour per week, the system may have 24 hours×W weeks=24×W data points. Each data point may have at least two dimensions including the number of samples and the total traffic of that hour aggregated one week. The system may split the data points into at least two data sets using a percentile threshold P (e.g., P=70, 75, 80) of the number of samples (or the number of requests logged) of the data points. Assuming P=75, the system may determine that there will be 75% of the data points having number of samples below P=75. Then, the system may split the data points into two sets including: a first set of data points having about 24×W×P % data points with number of samples equal to or smaller than the percentile threshold P and a second set of data points having about 24×W×(1−P%) data points with number of samples greater than the threshold P. Then, the system may perform a first regression on the first set of data points using a first regression function $y=f_1(x)$ for $x<=TH\_P$ and perform a second regression on the second set of data points using a second regression function $y=f_2(x)$ for $x>TH\_P$ (where x is the total number of samples, and y is the total traffic, P is the percentile threshold for the number of samples), TH_P is the corresponding x value for P-percentile (i.e., there are P % of the data points with $x<=TH\_P$, and (100−P) % of the data points with $x>TH\_P$). If function APPROX_PERCENTILE(x, P/100) is used, which returns the value at percentile P for x of all the data points, the value of TH_P may be determined by TH_P=APPROX_PERCENTILE(x, P/100). In particular embodiments, the system may use determine an absolute threshold value for the number of sample threshold based on the percentile threshold and use the absolute threshold value to spit the data points into multiple data sets for regression.

In particular embodiments, for the first regression function $y=f_1(x)$ for the first set of data points, the system may use a regression function which passes through the origin (i.e., $f_1(0)=0$) assuming that when there is zero sample there is zero traffic. For example, the system may use a linear function of $y=k_1 \times x$ as the first regression function for the first set of data points. For the second regression function $y=f_2(x)$, the system may use a regression function that does not pass through the origin. For example, the system may use a linear function $y=k_2 \times x + b_2$ as the second regression function for the second set of data points. For a given P=70 for data points aggregated per hour per week of a 6-week time window, the system may have 144 data points in total (e.g., 6×24=144 data points) and may use index of i=1, 2, 3, . . . , 144 for the data points. Each data point may be represented as $(x_i, z_i)$, where $x_i$ may be the number of samples for i-th data point and $z_i$ may be the network traffic value (e.g., Gbytes) for i-th data point. Using the threshold of P=70, the system may determine that the first set of data points including about 101 data points (6×24×0.7=101) for the first regression for number of samples $x_i<=TH\_70$, where TH_70=APPROX_PERCENTILE(x, 0.7). The second set of data points may include about 43 data points (e.g., 6×24×0.3=43) for the second regression for number of samples $x_i$>TH_70. The data points of the first set may have index of i=1, 2, 3, ..., 101 and the data points of the second set may have index of i=102, 103, ..., 144. The system may use the first function $y=k_1 \cdot x$ for the first regression on the first set of data points and may use the second function $y=k_2 \times x + b_2$ for the second regression on the second set of data points. The above regression method and parameters are for example purpose and are not limited thereto. The methods, processes, and principles can be extended to other parameters including, for example, but not limited to, time period durations of the aggregated data, number of sets to split data, number of regressions to be performed, thresholds used to split the data, etc. It is notable that, to calculate the total current traffic (e.g., in bits, or bytes), the computing system may overflow in the computing process and may switch to other units (e.g., GBytes, Mbytes, Gbits, Mbits, etc.) for computation to avoid computation overflow.

Figure 3A:
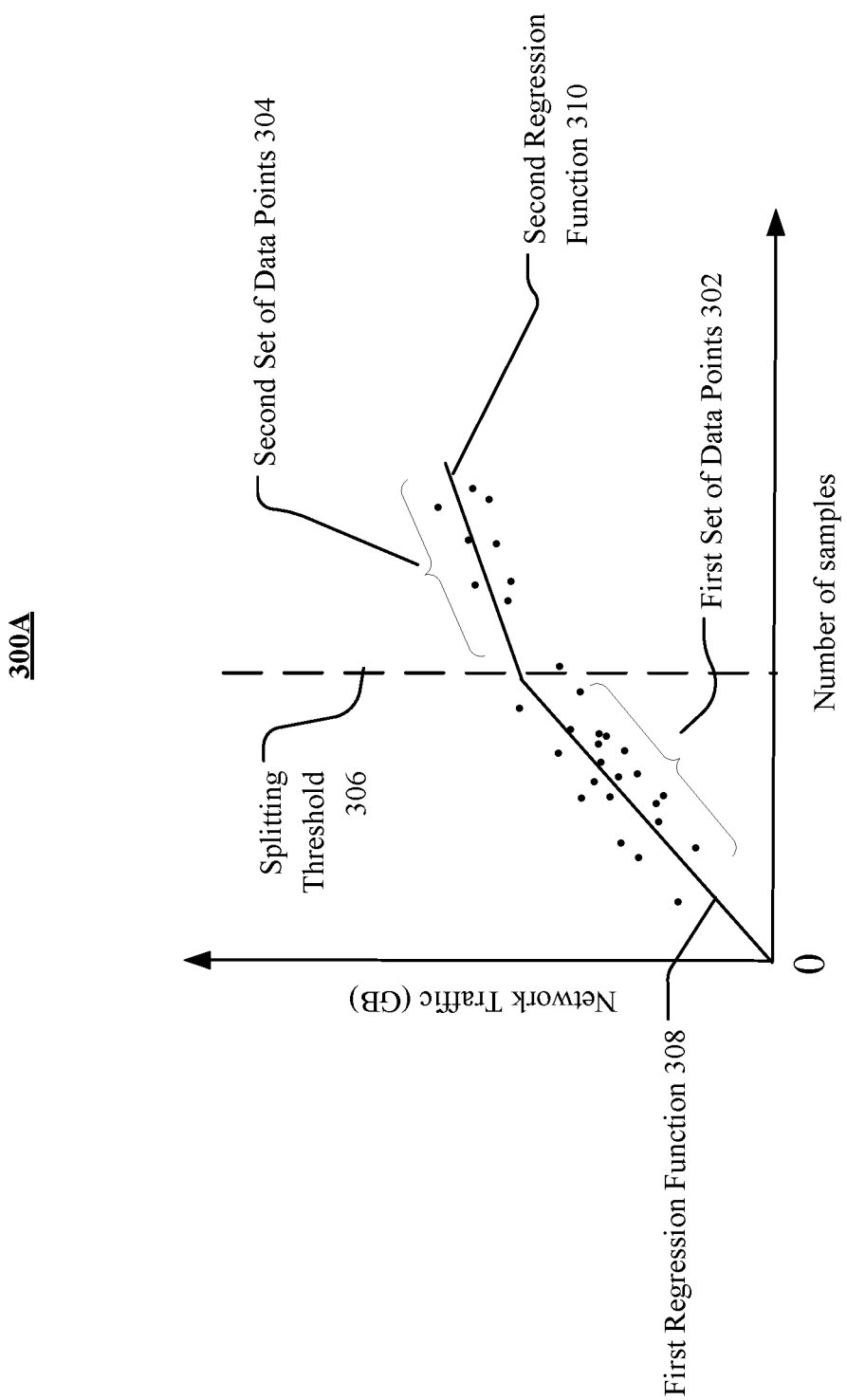
FIG. 3A illustrates an example regression process on aggregated data points for determining network traffic trends with respect to number of samples.

FIG. 3A illustrates an example regression process 300A on aggregated data points for determining network traffic trends with respect to number of samples. As an example and not by way of limitation, the system may generate the aggregated data points (e.g., aggregated per hour per week) correlating the network traffic to the number of samples, as shown in FIG. 3A. The system may determine a splitting threshold 306 (e.g., a 70-percentile threshold) for the number of samples and split the data points into a first set of data points 302 and a second set of data points 304. Then, the system may perform regression on the first set of data points 302 using a first regression function 308 of $y=f_1(x)$ to determine the network traffic trend based on the first set of data points (for x<=splitting threshold 306). For network traffic, the system may assume that the regression function $y=f_1(x)$ goes through origin (i.e., $0=f_1(0)$, when there is zero sample, there is zero network traffic). The system may perform regression on the second set of data points 304 using a second regression function 310 of $y=f_2(x)$ to determine the trend function based on the second set of data point 304 (for x>splitting threshold 306). The second regression function 310 of $y=f_2(x)$ may not pass through the origin. In particular embodiments, for the regression, the system may use a linear regression, a non-linear regression, or a combination of linear and non-linear regression. For example, the system may apply a linear regression on both the first and the second sets of data points. The first and second linear regression functions may have different slope or/and intersection values. As another example, the system may apply a linear regression on the first set of data points and a non-linear regression (e.g., a logarithm function) on the second set of data points. As another example, the system may apply a linear regression on the first set of data points and apply a non-linear regression on the whole set of data points including the first and the second sets of data points. As another example, the system may apply non-linear regressions on both the first and the second sets of data points.

Determine Increased Number of Samples

In particular embodiments, the system may determine the total increased number of samples in percentage $\Delta N_{sp}$ that will cause the access point to have X % total traffic loss. The system may apply the following linear regression function for the first regression on the first set of data points whose number of samples are equal to or smaller than the threshold P:

$$y=k_1 \cdot x \quad x \leq TH\_P \qquad (1)$$

where, $k_1$ is the slope of the linear regression function and its value may be determined by the regression analysis on the aggregated data points. In particular embodiments, the system may determine the total traffic of the access point based on observation data or the regression results. As an example, for a period of W=6 weeks and P=70, the total traffic $T_W$ of the W-week time window may be determined based on observation data using the data points aggregated from the collected data samples using the following equation:

$$T_W=\text{sum}(z_i) \ i=1,2,3,\ldots 144 \qquad (2)$$

As another example, for a period of W=6 weeks and P=70, the total traffic $T_W$ of the W-week time window may be determined based on the regression functions instead of the observation data using the following equation:

$$T_W=[\text{sum}(k_1 \cdot x_i) i=1,\ldots 101]+[\text{sum}(k_2 \cdot x_i + b_2) i=102,\ldots 144] \qquad (3)$$

In particular embodiments, to determine the total increased number of samples in percentage $\Delta N_{sp}$, the system may have each $x_i$ the number of samples increased to $x_i \times (1+\Delta N_{sp})$. Then, the system may determine the predicted total network traffic $T_P$ after considering the number of samples increase based on the first regression using the following equation:

$$T_P=\text{sum}[k_1 \cdot x_i(1+\Delta N_{sp})] \qquad (4)$$

The predicted total network traffic $T_P$ in Equation 4 may assume that the network traffic will follow the trend of the first regression result on the first set of data points ($x_i \leq TH\_P$) if the network traffic is not suppressed by the network capacity limitation or unsatisfied QoE. Consequently, the system may determine the increased number of samples in percentage $\Delta N_{sp}$ using the following equation:

$$\{\text{sum}[k_1 \cdot x_i(1+\Delta N_{sp})]-\text{sum}(z_i)\}/\text{sum}(z_i)=X\% \qquad (5)$$

where, X % corresponds to the total traffic loss specified for the out of capacity state. The traffic loss may be determined based on the predicted unsuppressed network traffic sum $[k_1 \cdot x_i(1+\Delta N_{sp})]$ and the network traffic of the W-week time window. It is notable that the "unsuppressed" network traffic may refer to (or may be interchanged with) the network traffic associated with the access point if the access point is upgraded or is assumed to be upgraded. By solving Equation (5), the total increase number of samples in percentage $\Delta N_{sp}$ may be determined by the following equation:

$$\Delta N_{sp}=\text{sum}(z_i) \times (1+X\%)/\text{sum}(k_1 \cdot x_i) \qquad (6)$$

Alternatively, the total increased number of samples in percentage $\Delta N_{sp}$ may be determined by using the total traffic of the W-week time window as determined based on regression rather than observation data using the following equation:

$$\Delta N_{sp}=\text{sum}(y_i) \times (1+X\%)/\text{sum}(k_1 \cdot x_i) \qquad (7)$$

Alternatively, in particular embodiments, the system may estimate the suppressed total traffic of the access point for a future time of (current week+M weeks) assuming that at the time of (current week+M weeks) the traffic loss percentage would meet the threshold of X %. It is notable that the "suppressed" network traffic may refer to (or may be interchanged with) the network traffic associated with the access point if the access point is not upgraded, is assumed to be not upgraded, or is assumed to be in the current state. The system may determine the suppressed total traffic of the time window ending at the (current week+M weeks) using the first regression and the second regression (which has taken into consideration the traffic loss factor). The estimated suppressed total traffic $T_M$ after M weeks from current week may be determined by:

$$T_M = \{[\text{sum}(k_1 \cdot x_i'), i=1, \ldots, I, x_i' \leq TH\_P] + [\text{sum}(k_2 \cdot x_i' + b_2), i=1, \ldots, I, x_i' > TH\_P]\} \quad (8)$$

where, $x_i'$ is equal to $x_i \cdot (1+\Delta N_{sp})$, I is the maximum index of the data points (e.g., for W=6 weeks, I=24×6=144). It is notable that the suppressed total traffic $T_M$ in Equation (8) may assume that the suppressed network traffic follows the trends as determined by the first and second regression functions. Then, the system may determine the unsuppressed total traffic of the time window ending at (current week+M weeks) using the first regression by assuming that the unsuppressed network traffic will follow the trend of the first regression function. The total traffic loss may be determined based on the comparison of the predicted unsuppressed network traffic and the predicted suppressed network traffic at (current week+M weeks). For example, for the total traffic loss X %, the increased number of samples in percentage $\Delta N_{sp}$ may be determined by solving the following equation:

$$\frac{[\text{sum } (k_1 \cdot x_i \cdot (1 + \Delta N_{sp})) - T_M]}{T_M} = X\% \quad (9)$$

where $T_M$ is the total traffic for the time window ending at (current week+M weeks), using two regressions, as shown in Equation (8). In equation (8), the conditions of $x_i' \leq TH\_P$ and $x_i' > TH\_P$ may be determined with approximation as follows:

$$T_M = \{[\text{sum}(k_1 \cdot x_i'), i=1, \ldots, I_P] + [\text{sum}(k_2 \cdot x_i' + b_2), i=I_P+1 \ldots, I]\} \quad (10)$$

where $I_P$ is determined using the following equation:

$$I_P = \text{round}\left(I \cdot \frac{P}{100}\right) \quad (10a)$$

where round ( ) is a round function (e.g., for W=6 weeks, I=144, P=70, round (I P/100)=round (144×70/100)=101). The approximation may assume that the condition of $x_i' \leq TH\_P$ and $x_i' > TH\_P$ (for the current week+M weeks) are the same as the condition $x_i \leq TH\_P$ and $x_i > TH\_P$ (the current week). In other words, for i=1, ..., $I_P$, the network traffic may follow the first regression and, for i=$I_P$+1, ..., I, the network traffic may follow the second regression. Then, by applying Equation (10), the numerator in Equation (9) may be determined to be [sum ($k_1 \cdot x_i'$), i=$I_P$+1, ..., I]−[sum ($k_2 \cdot x_i'$+$b_2$), i=$I_P$+1, ..., I]. For the denominator in Equation (9) (i.e., Equation (10) still has $x_i'$ inside), the system may approximate the denominator using the current total traffic (i.e., the traffic as in Equation (2) or (3)). This approximation would in general reduce the denominator if $x_i'$ is greater than $x_i$. The approximated percentage of the traffic lost at (the current week+M weeks) may be represented by $\hat{X}_m\%$, which uses the approximated numerator and denominator above and may be determined using the following equation:

$$\hat{X}_m\% = \{[\text{sum}(k_1 \cdot x_i'), i=I_P+1, \ldots, I] - [\text{sum}(k_2 \cdot x_i' + b_2), i=I_P+1, \ldots, I]\}/T_W \quad (10b)$$

The traffic lost at current week may be determined using the following equation:

$$X_0\% = \{[\text{sum}(k_1 \cdot x_i), i=I_P+1, \ldots, I] - [\text{sum}(k_2 \cdot x_i + b_2), i=I_P+1, \ldots, I]\}/T_W \quad (10c)$$

By comparing the two equations above, and considering $x_i'$ is equal to $x_i \cdot (1+\Delta N_{sp})$, the relationship of $\hat{X}_m\%$ and $X_0\%$ may be determined using following equation:

$$\hat{X}_m\% - X_0\% = \{(k_1 - k_2) \cdot [\text{sum}(x_i), i=I_P+1, \ldots, I] \cdot \Delta N_{sp}\}/T_W \quad (10d)$$

Then, the system may derive the total increased number of samples in percentage $\Delta N_{sp}$ using the following equation:

$$\Delta N_{sp} = \frac{T_W \cdot (\hat{X}_m\% - X_0\%)}{(k_1 - k_2) \cdot [\text{sum }(x_i), i = I_P + 1, \ldots, I]} \quad (10e)$$

And using the pre-set or pre-defined X % to replace $\hat{X}_m\%$ above, the system may derive the total increased number of samples in percentage $\Delta N_{sp}$ using the following equation:

$$\Delta N_{sp} = \frac{T_W \cdot (X_m\% - X_0\%)}{(k_1 - k_2) \cdot [\text{sum }(x_i), i = I_P + 1, \ldots, I]} \quad (11)$$

where $k_1$ is the slope of the first regression function, $k_2$ is the slope of the second regression function, $I_P$ is as in Equation (10a), X % is the pre-set or pre-defined or given percentage of the traffic loss at the week of (the current week+M weeks), and $X_0\%$ is as shown in Equation (10c), $T_w$ is the total traffic as shown in Equation (2) or (3). Equation (11) may be derived using approximation which has the advantage reducing computation by using an explicit equation to calculate the result directly. The system may first calculate $X_0\%$ using Equation (10c). If the pre-defined or given percentage meets the condition of X %≤$X_0\%$, the system may set $\Delta N_{sp}$ to zero. If X %>$X_0\%$ and $k_1 \leq k_2$ the system may set $\Delta N_{sp}$ to NULL (i.e., no answer, NULL returned). Otherwise, the system may determine the value of $\Delta N_{sp}$ using Equation (11).

Figure 3B:
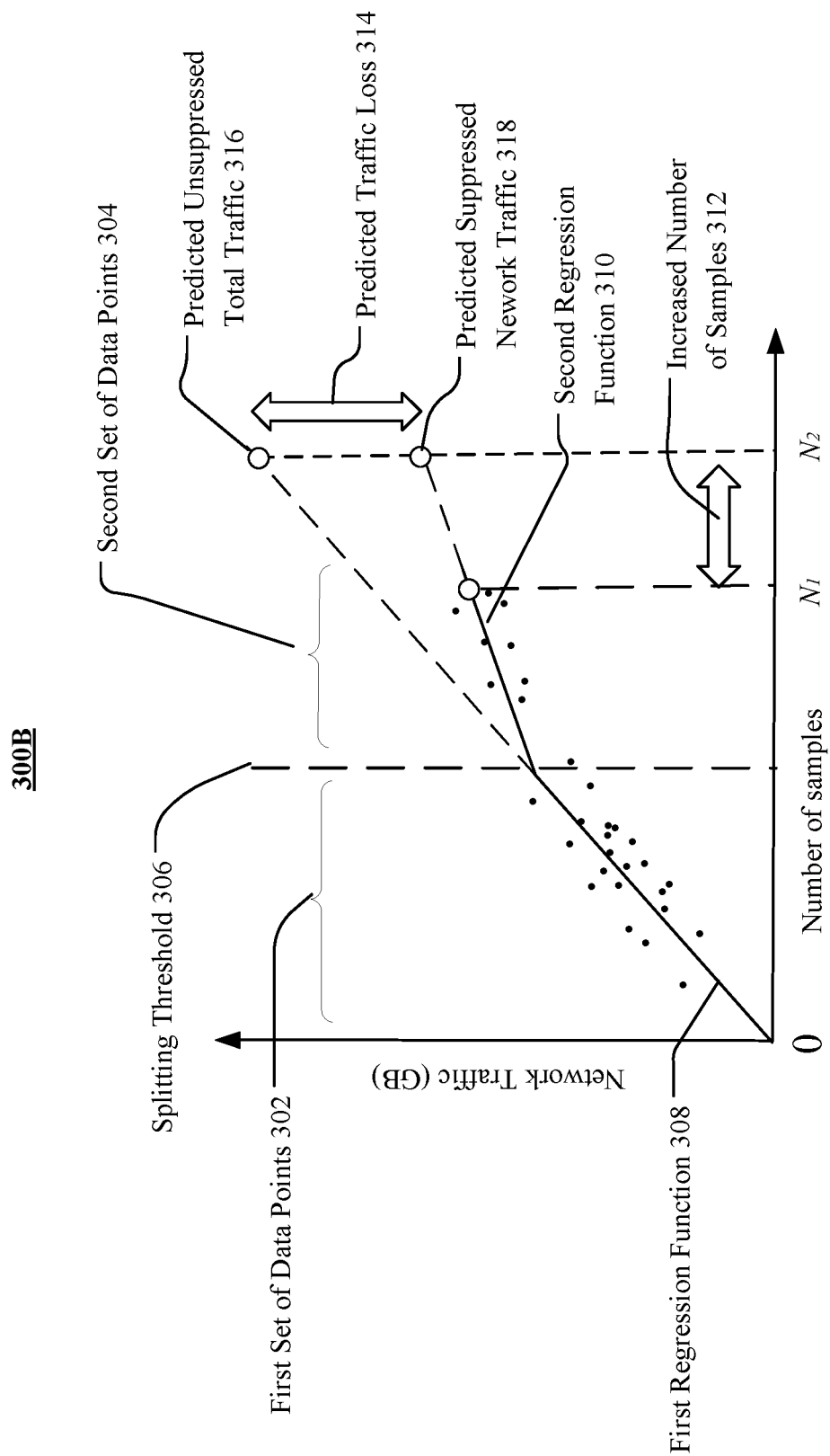
FIG. 3B illustrates an example process for determining increased number of samples in percentage corresponding to X % total traffic loss.

FIG. 3B illustrates an example process 300B for determining increased number of samples in percentage corresponding to X % total traffic loss. As an example and not by way of limitation, the system may assume that the unsuppressed network traffic may follow the trend as described by the first regression function 308. The predicted unsuppressed network traffic may be represented by the dot 316 which is on the extension line of the first regression function 308. Then, the predicted unsuppressed total network traffic $T_{P\_U}$ may be determined by using the following equation:

$$T_{P\_U} = \text{sum}(k_1 \cdot x_i \cdot (1+\Delta_{sp})) \quad (12)$$

where $\Delta N_{sp}$ is the increased number of samples in percentage that will cause the X % total traffic loss, $k_1$ is the slope of the first regression function 308, $x_i$ is the number of samples. For the suppressed network traffic, the system may assume that the suppressed network traffic may follow the trends as described by the first regression function 308 and the second regression function 310. The predicted suppressed network traffic may be represented by the dot 318 which is on the extension line of the second regression function 310, where $N_1$ may be the number of samples of current week, $N_2$ may be the number of samples that will cause the access point to be out of capacity. Then, the predicted suppressed total network traffic $T_{P\_S}$ may be determined using Equation (8) as reiterated in the following:

$$T_{P\_S} = \{[\text{sum}(k_1 \cdot x_i'), i=1, \ldots, I, x_i' \leq TH\_P] + [\text{sum}(k_2 \cdot x_i' + b_2), i=1, \ldots, I, x_i' > TH\_P]\} \quad (13)$$

As a result, given the X % total traffic loss, the system may determine the increased number of samples in percentage $\Delta N_{sp}$ by solving the following equation:

$$\frac{[\text{sum } (k_1 \cdot x_t \cdot (1 + \Delta N_{sp})) - T_{P\_S}]}{T_{P\_S}} = X \% \quad (14)$$

And by using the approximation as described above, $\Delta N_{sp}$ may be derived using Equation (11).

Determine Increasing Speed of Number of Samples Based on Mid/Long Term Trends

In particular embodiments, the system may determine a mid- or long-term trend of the number of samples over time based on regression analysis of the number of samples over a mid- or long-term time window (e.g., 1 year or multiple years). For example, the system may use a linear regression function $u=f_3(v)$ to determine the mid- or long-term trends, where v is the index of the weeks over a mid- or long-term time period (e.g., 1 year or multiple years), u is the number of samples. The system may collect the network performance data at the application level and aggregate the collected data samples into data points. Each data point may have two-dimensional (v, u), where v is the index of the week, and u is the number of samples (e.g., of a time window of 1 week corresponding to the x-th week). A regression may be performed on the time series data points which correlated number of samples to time in number of weeks. As an example, the system may use a linear regression $u=k_3 \times v + b_3$ for the mid- or long-term trends, where $k_3$ is the slope, $b_3$ is the intersection, v is the index of the weeks over the mid- or long-term time period, u is the number of samples. It is notable that although the time-window of 1 week for data aggregation is used for explanation purpose and is not limited thereto. For example, the aggregation time window may be any suitable number of weeks, for example, 1 week, 2 weeks, 4 weeks, 8 weeks, etc. To increase the robustness, the system may perform multiple regression analysis on different time windows of different lengths and use the average results of the multiple regression analysis and the final result. For example, the system may perform a first regression on data point aggregated on a first time window length (e.g., 1 week) and a second regression on data points aggregated on a second time window length (e.g., 2 weeks) and use the average of the two regression results as the final regression result.

Figure 4:
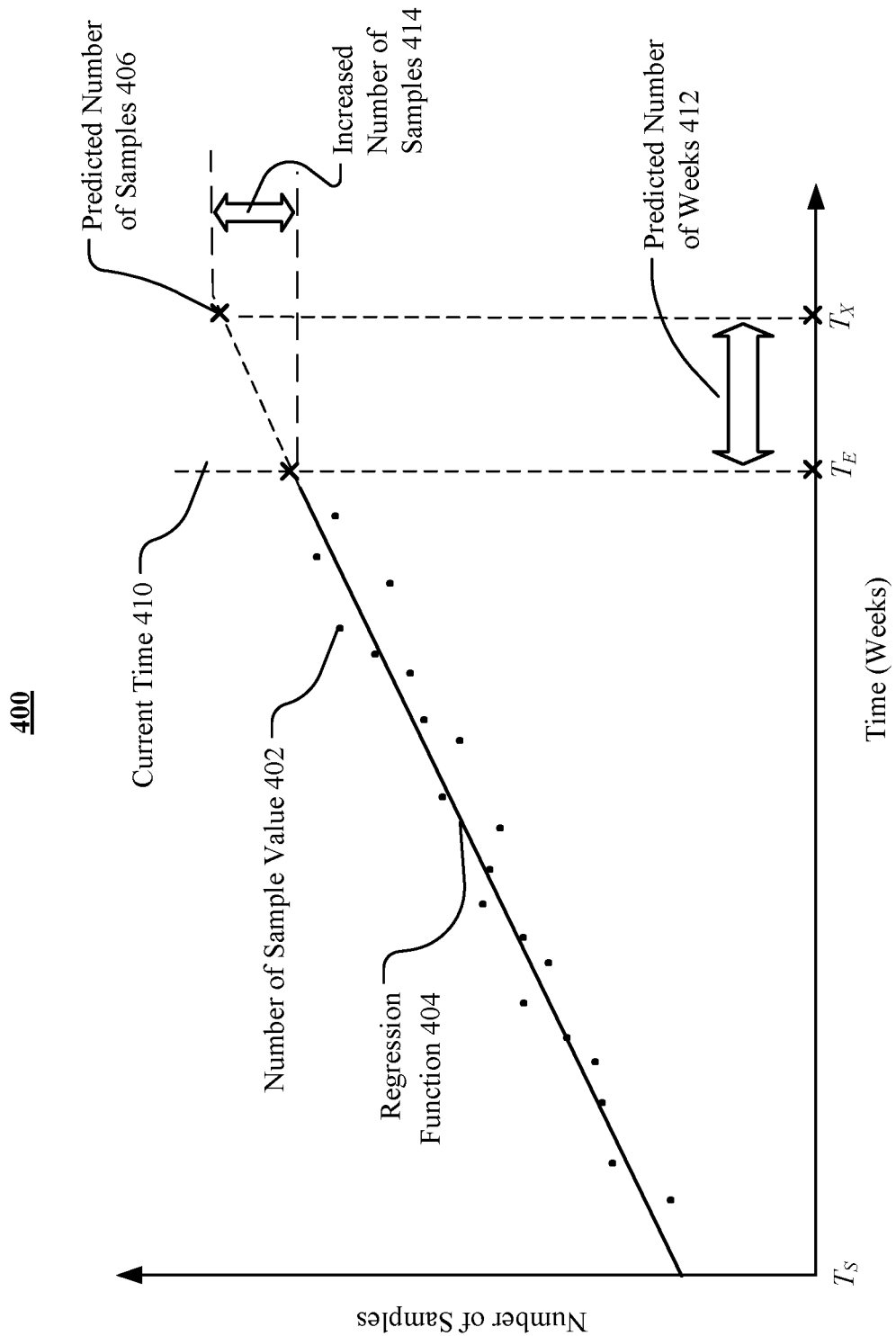
FIG. 4 illustrates an example process for determining a mid- or long-term trend of number of samples over time using a linear regression.

FIG. 4 illustrates an example process 400 for determining a mid- or long-term trend of number of samples over time using a linear regression. In particular embodiments, the system may determine a mid/long-term trend for total number of samples of an access point by performing linear regression or non-linear regression on the aggregated data points over a period of time (e.g., several weeks, several months, one or more years). For example, the system may use a linear regression function 404 to determine the trend of the number of samples. The system may use the linear regression function 404 to determine the mid- or long-term trend based on the number of samples over the period of time from a starting time $T_S$ to an end time $T_E$. In particular embodiments, $T_E$ may correspond to the current time 310 and the period of time from $T_S$ to $T_E$ may cover a recent past period of time (e.g., past 52 weeks, past year, past N years). In particular embodiments, the system may determine the mid- or long-term trend of the number of samples using a non-linear regression or a combination of linear regression and non-linear regression. In particular embodiments, the system may use the mid- or long-term trend to determine the increasing speed of the number of samples over time. For example, the system may use determine the increasing speed of the number of samples over time based on the slope value $k_3$ of the linear regression function 404.

In particular embodiments, for a given future time $T_X$, the system may predict future the number of samples based on the mid- or long-term trends. For example, the system may extend the regression function 404 beyond the time period from $T_S$ to $T_E$ and determine the predicted number of samples 406 for the future time $T_X$. In particular embodiments, the system may use the regression function 404 to predict the increase of the total number samples over a period of time of a particular length. For example, for a given time window of W weeks, the system may determine the total increase of the total number of samples using $k_s \times W$, where $k_s$ is the slope of the regression function 404. In particular embodiments, the system may determine the mid/long-term network metric trend using a sliding time window (e.g., a 28-day time window, a N-week sliding time window, a 1-year sliding time window, etc.). The system may incrementally update the aggregated data points based on the sliding time window and the calculated trend function periodically (e.g., daily, weekly, monthly). The incrementally updated data points and trends may provide more accurate prediction for future time by factoring in the recently collected and aggregated data points.

In particular embodiments, the system may determine the increasing speed of the number of samples $S_p$ (e.g., increased percentage of number of samples per week) based on an average increased number of samples percentage per week using the following equation:

$$S_p = k_3 / (k_3 * V + b_3) \quad (15)$$

where V is the total number of weeks duration of the data on which the regression analysis is performed (e.g., V=52 weeks, if the data samples are collected during a 52-week time window). In particular embodiments, the system may determine the increasing speeds of the number of samples $S_p$ using different number of weeks for the aggregation time window. For example, the system may determine four values $S_{p\_F}$ for the increasing speed of the number samples in percentage using the aggregation window lengths of 1 week, 2 weeks, 3 weeks, and 4 weeks. Then, the system may determine an average increasing speed of the number of samples in percentage $S_{p\_avg}$ of based on the values of $S_{p\_F}$ derived based on different aggregation time windows using the following equation:

$$S_{p\_avg} = \text{average}(S_{p\_F}) \quad (16)$$

Determine Predicted Time for Out of Capacity

In particular embodiments, after determining the average increasing speed of number of samples in percentage, the system may determine the number of weeks N after which the access point will become out of capacity using the following equation:

$$N = \Delta N_{sp} / S_{p\_avg} \quad (17)$$

where $\Delta N_{sp}$ is the increased number of samples in percentage that would cause X % percentage total traffic loss, $S_{p\_avg}$ is the average increasing speed of number of samples in percentage. According to Equation (11), the system may first calculate $X_0\%$ as shown in Equation (10c). If the pre-defined or given percentage meets the condition of X % $\leq X_0\%$, the system may set N to zero. If X % $> X_0\%$, and $k_1 \leq k_2$, the system may set N to NULL (i.e., no answer, NULL returned). Otherwise, the system may combine Equations

(11) and (17) to directly compute N. In particular embodiments, for a given X % of total traffic loss, the system may determine multiple values for predicted number weeks of out of capacity based on different value combinations of number of weeks W and the percentile threshold P, where W is the length of the time window associated with the data points, P is the percentile threshold for splitting the data points into multiple data sets. For example, for W=6, 8, 10 weeks and P=70, 75, 80, the system may have 9 value combinations of (W, P). For each value combination, the system may determine one value of predicted number of weeks corresponding to total traffic loss of X %. Then, the system may determine an average number of weeks $N_{avg}$ based on the 9 values for the number of weeks and use the average value as be the final value for the predicted number of weeks when the access point will have X % total traffic loss, as shown in the following equation:

$$N_{avg} = \text{average}(N_{W\_P}) \quad (18)$$

where each $N_{W\_P}$ is the predicted number of weeks for a combination of values (W, P). As an alternative, the system may use the median value of these 9 values, instead of the average value as the final value for the predicted number of weeks after which the access point will be out of capacity. As another alternative, the system may use the average or median of the remaining values after removing some of the values (e.g., the max value, the min value, the outlier values, etc.) from the 9 values. By using the average value $N_{avg}$ determined based on multiple (W, P) value combinations, the system may enhance the prediction accuracy and robustness for the number of weeks for the access point to be out of capacity.

Alternative Methods

In particular embodiments, the method may use some approximation such as round operations for predicting the amount of time until an access point is out of capacity. In particular embodiments, to improve the prediction accuracy, the system may use an alternative method to determine the predicted amount of time until the access point is out of capacity while mitigating the usage of the approximation. In particular embodiments, the system may determine a set of future weeks from current time. For example, the system may determine a first set of weeks including weeks of (0, 2, 4, 6, 8, 10, 12, 14, 16, 18, 20) from the current time. As another example, the system may determine a second set of weeks including weeks of (0, 1, 2, 3, . . . , 18, 19, 20) from the current time. Then, for each number of week value m in the week set, the system may calculate the predicted traffic loss percentage corresponding to the week of (current week+m weeks). After that, the system may determine a time series of traffic loss percentage values for the weeks in the week set. The time series of traffic loss percentage values may be correlated to the week numbers m in the corresponding week set (e.g., shown in FIG. 5). Then, for a given a traffic loss percentage X % (e.g., 5%, 10%, 15%, etc.), the system may determine a corresponding m value which correspond to a traffic loss percentage that is closest to X %. The system may use the corresponding m value as the output of predicted number of weeks. As an example, the system may determine the predicted number of weeks $M_X$ corresponding to the traffic loss of X % using the following equation:

$$M_X = \min \text{abs}(m_X - X\%) \quad (19)$$

where min operation finds the closest m value in the week set corresponding to X % traffic loss, abs( ) is the absolute value function. In this example, if $M_X$=0, the system may determine that the access point at the current week is already having traffic loss of X %. If $W_X$=20, the system may determine that the access point will be losing traffic of X % in at least 20 weeks (e.g., 20 weeks or beyond 20 weeks) from current week. In particular embodiments, the system may also determine maximum number of weeks causing X % traffic loss. For example, the system may determine that the access point will have X % traffic loss in at most $M_X$=24 weeks (e.g., within 24 weeks). The system may determine priorities for a number of access points based on the predicted numbers of weeks that correspond to X % traffic loss in respective access points. The system may filter out the access point that are not urgent for attention since these access points take a longer time to be out of capacity.

In particular embodiments, to improve the robustness for predicting the number of weeks until the access point is out of capacity, the system may determine multiple values for the predicted number of weeks using multiple values for W and multiple values for P (e.g., W=6, 8, 10 weeks and P=70, 75, 80). The system may use the average value of the multiple predicted number of weeks as the final predicted result. The system may use the similar method to the previous method to get the two regressions including a first regression for data points with low number of samples and a second regression for data points with high number of samples. Then, the system may calculate the traffic loss at the week of (current week+m weeks) by comparing the traffic calculated using the first regression at the high number of samples to the traffic calculated using the first regression and the second regression on the whole set of data points (including both low and high number of samples).

As an example and not by way of limitation, given P=70 and data points of W=6 weeks (e.g., 6×24=144 data points), the system may use index i=1, 2, 3, . . . , 144 for the data points. Each data point may be represented as $(x_i, z_i)$, where $x_i$ is the number of samples for i-th data point, and $z_i$ is the traffic (e.g., GB) for i-th data points. The system may determine a first set of data point including roughly (6×24× 0.7)=101 data points for the first regression for number of samples $x_i <=$ TH_P, and a second set of data points including (6×24×0.3)=43 data points for the second regression for number of samples $x_i >$ TH_P. The system may use index of i=1, 2, 3, . . . , 101 for those data points in the first set and index of i=102, 103, . . . , 144 for those data points in the second set. Given the first regression of $y=k_1 \times x$ and the second regression of $y=k_2 \times x + b_2$, the system may determine, at m=0 for the current week, the traffic loss using the following equation:

$$X_0\% = \{[\text{sum}(k_1 \cdot x_i), i=102, \ldots 144] - [\text{sum}(k_2 \cdot x_i + b_2), i=102, \ldots 144]\}/T_W \quad (20)$$

where, $X_0$% is the total traffic loss percentage at current week with m=0, $T_W$ is the total traffic of the W-week time window as determined using Equation (2) or Equation (3). Alternatively, the traffic loss may be determined based on observation results instead of the regression results using the following equation:

$$X_0\% = \{[\text{sum}(k_1 \cdot x_i), i=102, \ldots 144] - [\text{sum}(z_i), i=102, \ldots 144]\}/T_W \quad (21)$$

Or, alternatively, the above equations (20-21) may be written in the following formats as shown in Equation (21a) or (21b):

$$X_0 \% = \frac{[\text{sum } (k_1 \cdot x_i), i = 1, \ldots 144]}{T_W} - 1 \quad (21a)$$

$$X_0\% = \frac{[\text{sum}(k_1 \cdot x_i), i=1, \ldots 144] - T_W}{T_W} \quad (21b)$$

where, $T_W$ is the total traffic of the W-week time window until current week, as determined using Equation (2) or Equation (3). For the week of (current week+m weeks), the system may assume that each $x_i$ for i=1, 2, ..., 144 is increased to $x_i' = x_i \cdot (1 + \Delta N_{sp})$. The system may determine the traffic loss percentage at the week of (current week+m weeks) using the following equation:

$$X_m\% = \{[\text{sum}(k_1 \cdot x_i'), i=1, \ldots 144, x_i' \le \text{TH\_}P] - [\text{sum}(k_2 \cdot x_i' + b_2), i=1, \ldots 144, x_i' > \text{TH\_}P]\}/T_M \quad (22)$$

Alternatively, the above Equation (22) may be written in the following formats shown in Equation (22a) or (22b):

$$X_m\% = \frac{[\text{sum}(k_1 \cdot x_i'), i=1, \ldots 144]}{T_M} - 1 \quad (22a)$$

$$X_m\% = \frac{[\text{sum}(k_1 \cdot x_i'), i=1, \ldots 144] - T_M}{T_M} \quad (22b)$$

In Equations (22a) and (22b), the total traffic $T_M$ may be determined based on the regression results using Equation (8), which is the total traffic of the W-week time window until (current week+m weeks). In particular embodiments, $X_m\%$ may refer to the percentage of the predicted traffic lost in (current week+m weeks), comparing the total traffic if all the data points are riding on the first regression curve, and the total traffic of the two regressions considering the increased number of samples in (current week+m weeks), as shown in Equation (8). In particular embodiments, $X_m\%$ may refer to the percentage of the predicted traffic gain in (current week+m weeks), if at (current week+m weeks) the access point is assumed to be upgraded, comparing the predicted future traffic if the access point is not upgraded at (current week+m weeks) (i.e., comparing the total traffic if all the data points are riding on the first regression curve, and the total traffic of the two regressions considering the increased number of samples in (current week+m weeks) as shown in Equation (8)). As another alternative, in particular embodiments, the system may replace $T_M$ by $T_W$, in Equations 22, 22a, or 22b. In particular embodiments, $X_m\%$ may refer to the percentage of the predicted traffic lost in (current week+m weeks), comparing the total traffic if all the data points are riding on the first regression curve, and the total traffic of W-week time duration until the current week, as shown in Equation (2) or (3). In particular embodiments, $X_m\%$ may be refer to the percentage of the predicted traffic gain in (current week+m weeks), if at (current week+m weeks) the access point is assumed to be upgraded, comparing the current traffic (i.e., comparing the total traffic if all the data points are riding on the first regression curve, and the total traffic of W-week time duration till the current week, as shown in Equation (2) or (3)). In particular embodiments, the predicted traffic gain due to access point upgraded as described above (i.e., $X_m\%$ in Equations 22, 22a, and 22b, and the alternative of replacing $T_M$ by $T_W$, in Equations 22, 22a, and 22b) may be utilized in network planning, prioritization, or optimization analysis. The utilization may be similar to that the out of capacity prediction. For example, the number of predicted weeks that the traffic loss would hit X % may be utilized in network planning, prioritization, or optimization analysis, as described in detail in other sections of this disclosure.

In particular embodiment, the system may repeat the above process to calculate the total traffic loss percentage for each of the m-th week of the week set with different value combinations of P and W. For example, if P has a value set of (70, 75, 80) and W has a value set of (6, 8, 10), the system may have 9 combinations for P and W values. The system may determine 9 values for total traffic loss percentage for each week of the week set. For a given m value, the system may determine an average total traffic loss percentage of all combinations of (P, W) values using the following equation:

$$X_{m\_avg}\% = \text{average}(X_{m(P,W)}\%) \text{ for all } (P,W) \text{ combinations} \quad (23)$$

The system may repeat the above process to use $X_{m\_avg}\%$ as the calculated the total traffic loss percentage for each of the m-th week of the week set. Once all calculated the total traffic loss percentage value are determined for the week set, the system may determine the predicted number of weeks N for a given X % of the traffic loss based on the calculated value set of $X_{m\_avg}\%$. The predicted number of week N may correspond to a minimum or maximum m value in the week set that is closest to the value corresponding to the X % total traffic loss. As an alternative, in particular embodiments, the system may use regressions, instead of a minimum or maximum m value in the week set that is closest to the value corresponding to the X % total traffic loss, to determine the predicted time for out pf capacity, as illustrated by the following example.

Figure 5:
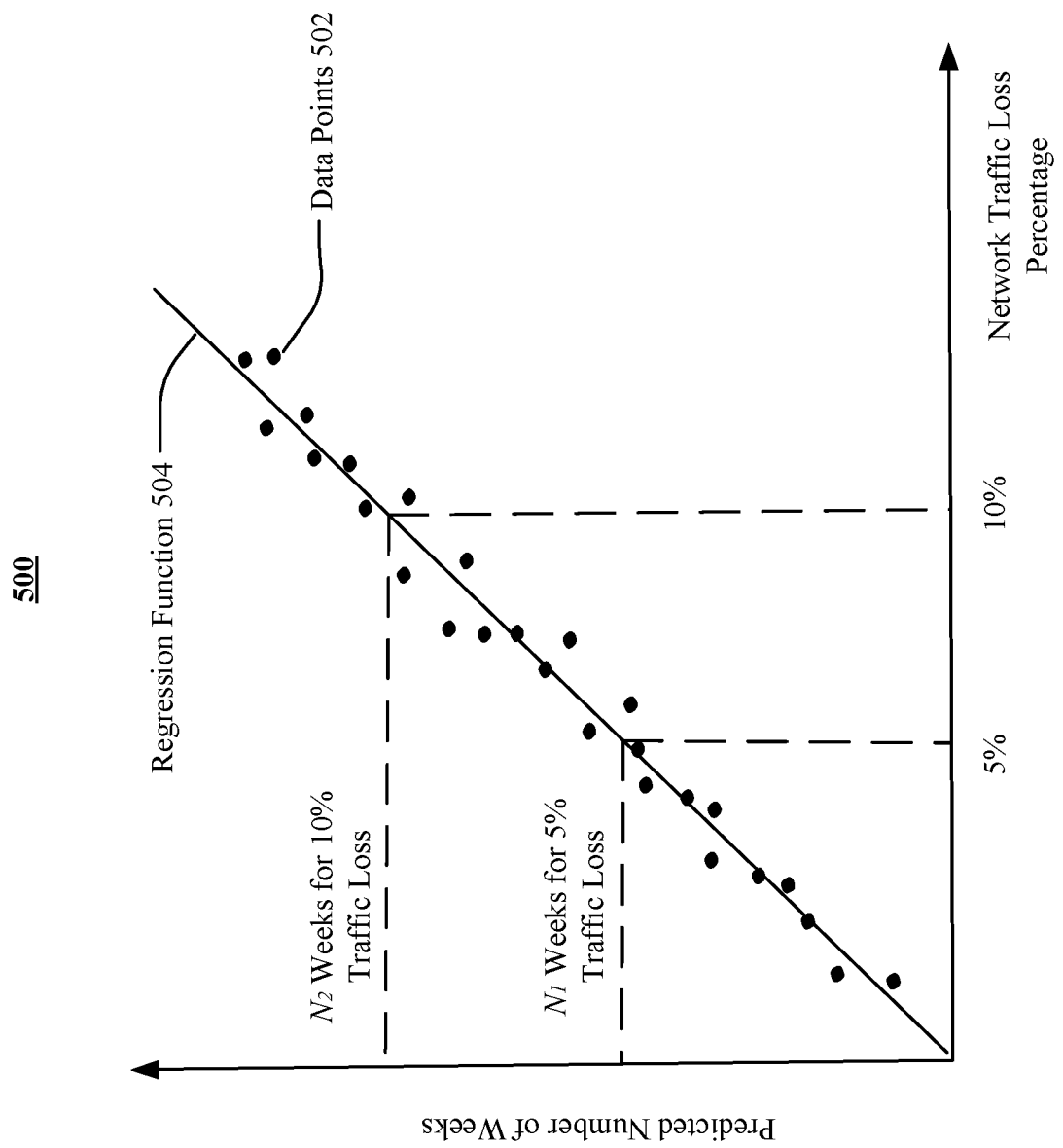
FIG. 5 illustrates an example process for predicting the amount of time until an access point is out of capacity.

FIG. 5 illustrates an example process 500 for predicting the amount of time until an access point is out of capacity. In particular embodiments, the system may perform a regression (e.g., linear regression, non-linear regression) on the data points correlating the number of weeks to the network traffic loss percentage. As an example and not by way of limitation, the system may use the regression function 504 on the data points 502 which correlate the number of weeks to the network traffic loss percentage. Then, for the associated access point, the system may use the regression result to determine the number of weeks N for a given X % of the traffic loss. For example, for a week set of (0, 1, 2, 3, ..., 18, 19, 20), the system may have 20 data points with each point being associated with a combination of ($X_{m\_avg}$, m) values. Then, the system may perform a regression analysis on these data points using the following equation:

$$m = h(X_{m\_avg}) \quad (25)$$

where h( ) is the regression model results. Although a linear regression is used in the figure as an example, the regression is not limited thereto. The regression may be a linear regression, a non-linear regression, a combination of linear and non-linear regression, or any suitable regressions. Then, the system may determine the predicted number of weeks based on the regression model results. For example, for 5% traffic loss, the number of weeks N may be determined to be h(5%). As another example, for 10% traffic loss, the number of weeks N may be determined to h(10%). In particular embodiments, the system may use the data points determined based on a combination of values (P, W) before the averaging operation to have more data points for a given for regression analysis. In particular embodiments, the regression results on Equation (25) based on Equation (22a) or (22b), and the results combining Equations (11) and (17) may be close to each other. As an extension, in particular embodiments, the system may combine the results of methods as described in Equations (11) and (17), and the results of methods as described in Equation (25), to get a final result (e.g., by further averaging all the results from these methods).

In particular embodiments, the system may use a time series of the traffic loss (e.g., traffic loss at the current week $X_0\%$, as in Equations (10c), (20), (21), (21a), (21b), or traffic loss of $X_m\%$, as in Equations (22), (22a), (22b) by setting m=0), including the traffic loss at the current week and the previous V weeks as historical data (indexed by the week), to predict the traffic loss at the week of (current week+m weeks) or any future weeks. Assuming at the first, second, . . . , V-th week prior to the current week, the respective traffic loss values at the respective weeks are $X_{0,-1}\%$, $X_{0,-2}\%$ . . . , $X_{0,-V}\%$, which are the historical data (i.e., already calculated at the respective week (in the past) using the equations for the current week), the time series may include $X_{0,-V}\%$, $X_{0,-V+1}\%$, $X_{0,-V+2}\%$, . . . , $X_0\%$, for v=−V, −V+1, −V+2, . . . , 0. The system may determine the regression functions or models based on the time series. For example, the system may determine the regression function or model using the following equation:

$$X_{0,v}\% = g(v) \quad (26)$$

where g( ) is a regression function or model with independent variable of v and dependent variable of $X_{0,v}\%$. This regression function may be used to predict the traffic loss in future weeks (e.g., at the week of (current week+m weeks)). And the predicted traffic loss may assume that the access point is not upgraded. Or, in particular embodiments, the system may determine the predicted traffic gain assuming that the access point is to be upgraded using the following equation:

$$X_{0,m}\% = g(m) \quad (27)$$

In particular embodiments, the predicted traffic loss may be a result combing the above results and the results from other methods (e.g., as the average of the results of Equations (27) and Equations (22) or (22a), (22b)). The time series $X_{0,-V}\%$, $X_{0,-V+1}\%$, $X_{0,-V+2}\%$, . . . , $X_0\%$, for v=−V, −V+1, −V+2, . . . , 0, may be used to predict the number of weeks in which the traffic loss would be X % (out of coverage for the access point). The system may determine the regression functions or models based on the time series using the following equation:

$$v = r(X_{0,v}\%) \quad (28)$$

where r( ) is a regression function or model with independent variable of $X_{0,v}\%$ and dependent variable of v. This function may be used to predict the number of weeks m, at the week of (current week+m weeks) in which the traffic loss would hit X % using the following equation:

$$m = r(X\%) \quad (29)$$

In particular embodiments, as an extension, the predicted number of weeks may be a result combining the above results and the results from other methods (e.g., as the average of the results of Equations (29) and Equations (25) or (17)).

In particular embodiments, for the time series $X_{0,-V}\%$, $X_{0,-V+1}\%$, $X_{0,-V+2}\%$, $X_0\%$, for v=−V, −V+1, −V+2, . . . , 0, which is the traffic loss at v-th week $X_0\%$, as in Equations (10c), (20), (21), (21a), (21b), or $X_m\%$, as in Equations (22), (22a), (22b) by setting m=0, the threshold TH_P as used in, for example, Equations (1) and (10), may not need to be always fixed as P=70, or 75 or 80. For initial weeks, a fixed P can be used. Then, if at a particular week v=V_th, $X_{0,v}\% > X_{0\_TH}\%$ or after the V-th week, TH_P may be replaced by the TH_P used at week of v=V_th. Then, a comparison based on a common baseline may be used for all the weeks later than the week of v=V_th. Here, $X_{0\_TH}\%$ may be a given threshold, for example, 0%, 0.5%, 1%, or 2%, etc. For robustness, the system may use an alternative method which may wait until at least for M weeks (e.g., M=2, 3, etc.) $X_{0,v}\% > X_{0\_TH}\%$ has occurred, or for M weeks within M_TOTAL weeks (M_TOTAL>=M), where the occurrence may be consecutive or not. Beyond that point on, all the latter weeks may use a common threshold TH_P used at week of v=V_th.

In particular embodiments, the time series of traffic loss $X_{0,v}\%$ used in regressions for Equations (26), (28) at the v-th week may be smoothed values over the time. For example, the system may determine an average value of the values in a sliding window of SLIDING_WEEKS (e.g., 2, 4, etc.) weeks up to the v-th week. Using SLIDING_WEEKS=4 as an example, the smoothed value for the v-th week may be the average $X_{0,v}\%$ of v-th, (v−1)-th, (v−2)-th, (v−3)-th week. Similarly, the predicted values may be the smoothed values over the weeks up to the current week. Using SLIDING_WEEKS=4 as an example, the smoothed value for prediction $X_m\%$ as in Equation (22) which is calculated at the current week to predict the traffic loss at the week of (current week+m weeks), may be the average value of calculated at v=0, −1, −2, −3, where $X_{m,v}\%$ is the prediction $X_m\%$ as in Equation (22) which is calculated at the v-th week to predict the traffic loss at the week of (v+m weeks). Similar smoothing processes may be used to predicted number of weeks as shown in, for example, Equations (29), (25), (17).

Priority Recommendations for Network Planning

Identifying Areas with QoE Problems

In particular embodiments, the system may identify one or more areas of interest covering one or more access points for predicting the amount of time until these access points are out of capacity. As an example, the system may identify an area covering one or more cells with network congestion as a geographic area of interest. U.S. patent application Ser. No. 16/155,510, entitled "Detecting Communication Network Insights of Alerts," filed on 9 Oct. 2018, which is incorporated by reference as an example only and not by way of limitation, discloses examples of detecting network congestion of a communication network. U.S. patent application Ser. No. 16/226,477, entitled "Detecting Communication Network Insights of Alerts," filed on 19 Dec. 2018, which is incorporated by reference as another example only and not by way of limitation, discloses examples of detecting network congestion of a communication network. U.S. patent application Ser. No. 16/389,226, entitled "Communication Network Optimization Based on Predicted Enhancement Gain," filed on 19 Apr. 2019, which is incorporated by reference as another example only and not by way of limitation, discloses examples of predicting enhancement gain of communication network optimizations.

Priority Recommendations for Network Planning

In particular embodiments, the system may determine a priority score for each of the monitored access points based on the predicted amount of time (e.g., number of weeks) until these access points will be out of capacity. In particular embodiments, the system may generate one or more alerts that one or more of the monitored access points will be out of capacity within certain amount of time. For example, the system may generate alerts for access points that are predicted to have 5% traffic loss in N weeks. The system may identify and flag access points that are of the worst access points (e.g., having the highest priority scores) for particular geographic regions, carriers, or/and network generations. In particular embodiments, for the final results of the predicted number of weeks for the access point to be out of capacity, the system may filter out the access points that have the number of weeks (from current time until becoming out of capacity) above a pre-determined threshold (e.g., 100 weeks, 120 weeks, etc.). The system may assign a low priority to the accessing points having predicted N numbers greater than the threshold. For example, if an access point is predicted to take an amount of time longer than the threshold week number to be out of capacity, the system may assign a low priority to that access point. The system may also filter out the access points that are predicted to have negative or zero increase in number of samples. The system may assign a low priority to such access points because the demand as indicated by the number of samples is predicted to not increase. As an alternative, the system may filter out the access points that are predicted to have the increased number of samples below a threshold (e.g., 1e-6, 1e-4, etc.) and assign a low priority to these access points since their number of samples increases are predicted to be relatively small.

In particular embodiments, the system may use the predicted numbers of weeks N for access points to become out of capacity to prioritize network optimization and network planning, for example, network upgrading (e.g., from 3G to 4G, from 4G to 5G, from 3G to 5G, etc.), network expansion (e.g., adding more cells, etc.), network capacity enhancement (e.g., using more advanced technologies at the air interface, using more antennas, interference mitigation, multi-user MIMO), etc. The system may assign a higher priority for the access points that are predicted to have smaller number of weeks N to become out of capacity. The system may use the predicted number of weeks N together with other metrics (e.g., number of samples, predicted number of sample increase in percentage, etc.) to determine the priority for associated access points. For example, the system may use the number of samples as the weight for the predicted number of weeks N to determine the priorities of associated access points. The system may determine a priority metric by multiplying the number of samples with the predicted number of weeks N.

FIG. 6 illustrates example access points (e.g., A1-A12) with predicted number of weeks for out of capacity. As an example and not by way of limitation, the system may predict, for 12 access points (e.g., A1 to A12), the number of weeks to become out of capacity. The system may determine the priority for each of the access points based on the predicted number of weeks for out of capacity or/and the number of samples. For example, the system may assign a higher priority to the access point A3 than the access point A11 because the access point A3 is precited to be out of capacity in about 1.5 weeks while the access point A11 is precited to be out of capacity in about 7 weeks (and the access points of A3 and A11 have roughly the same number of samples). As another example, the system may assign a higher priority to the access point A6 than the access point A4, because although the access point A6 is predicted to be out of capacity in about 5 weeks while the access point A4 is predicted to be out of capacity in about 3 weeks, the access point A6 has a much greater number of samples (e.g., 14426) than the access point of A4 (e.g., 1497). An access point with a greater number of samples may indicate a higher network connection demand and a larger affected user population, and therefore may need a relatively higher priority for the MNOs' attention.

In particular embodiments, the system may normalize the predicted number of weeks N for all the access points in a region of a carrier of a particular network generation (e.g., 4G). The access points that have predicted number of weeks N greater than 100 or less than 0 may be filtered out before the normalization process. The normalized results may be in the range of (0, 1) with the maximum value of predicted number of weeks N corresponding to 0 and the minimum value of predicted N (after filtering) corresponding to 1. A higher normalized value may indicate a higher level of urgency for network upgrade for capacity purpose. The system may also normalize predicted number of samples increase. Before the normalization, the cells that have negative or zero increase in predicted number of samples may be filtered out. The normalization results may be in the range of (0, 1) with a higher value of the nonnormalized result indicating a higher level of urgency for network capacity upgrade. Then, the system may assign priority levels to respective access points based on the normalized results.

In particular embodiments, the system may determine and normalize one or more composite metrics including, for example, but not limited to, number weeks to become out of capacity×number of samples, number of sample increase percentage x number of samples, etc. Then, the system may determine the priorities for the access points based on the normalized composite metrics. For example, the system may assign higher priorities to access points with higher normalized values of (e.g., normalized value >0.8). The normalized values may be filtered by a threshold before (e.g., 0.5) being used for determining the priorities. In particular embodiments, different types of normalized composite metric values may be used in combination for determining the priorities of access points. For example, the system may predict the number of samples using the predicted number of samples increase percentages. Then, the system may determine, for each carrier, a predicted market share percentage using the predicted number of samples. The system may determine the predicted market share for the access points and map to the tile map via weighted average of the overlapping portions of the access points and tiles. Then, the system may determine the predicted carrier market share percentages of the tiles on the tile map. In particular embodiments, the system may directly determine the predicted market share percentage on the tile map. For example, the system may determine the predicted samples on different tiles and use the predicted number of samples of all the carriers to determine the predicted market share percentage of a particular carrier. If predicted market share percent is lagging not only in percentage but also the absolute values, the system may flag the related areas and access points of this carrier for MNO's attention or assign a higher priority to these areas and access points for network upgrading purpose.

In particular embodiments, the system may determine the priority scores for the access points based on a combination of one or more network metrics. In particular embodiments, the system may determine the priority score (and incentive scores) for upgrading access points based on, for example, but not limited to, predicted number of weeks to be out of capacity, predicted number of samples, predicted number of sample increase, predicted network speeds, predicted densification gain of network speed, predicted densification gain of network traffic, predicted densification gain of number of samples, etc. In particular embodiments, the system may determine the priority scores and incentive scores based on a weighted combination of one or more of the above network metrics.

Optimization Recommendations

In particular embodiments, the system may generate one or more network optimization or enhancement recommendations (e.g., cell densification, upgrading capacity, upgrading to 4G/5G, tuning cellular towers, tuning antenna angles, adding more sectors, adding fiber links, strengthening fiber backhaul) for one or more access points based on the assigned priority and predicted amount of time to be out of capacity. The system may generate network enhancement recommendations for the related network enhancement operations based on the priority scores of the areas of interest covering the access points of interest. For example, the system may provide network optimization recommendations on whether to optimize the network in particular areas (e.g., high network traffic areas) or particular access points, which aspects to optimize for (e.g., network upgrading, network expansion, adding more cells, cell densification), where and when exactly to optimize (e.g., where and when to add cells for cell densification), etc.

In particular embodiments, the system may perform network optimization (e.g., at platform level, infrastructure level, device level, or application level) based on one or more network optimization recommendations. The system may optimize the communication (e.g., infrastructure level, application level) based on information from multiple layers of the system (e.g., both infrastructure level and application level) instead of information from one single layer only (e.g., infrastructure level only or application level only) to improve network performance. In particular embodiments, the system may generate network optimization plans for long-term optimization (e.g., cell densification, upgrading network to 4G/5G, adding fibers, strengthening fiber backhaul) or short-term optimization planning (e.g., tune tower antenna angles, balancing demands and capacity) based on the predicted network enhancement gain. In particular embodiments, the optimization recommendation may be generated using a machine-learning (ML) model which is trained based on historical data.

In particular embodiments, the system may provide supporting and feedback information to the network optimization (e.g., at infrastructure level) based on the collected application data. In particular embodiments, the system may detect network coverage and capacity issues of cells at large scale and predict for a large number of cells when these cells will be out of capacity. The system may provide more effective network optimization recommendations with reduced cost for improving the network performance and end users' QoE. For example, the system may optimize network infrastructure more effectively (e.g., upgrading capacity, tuning cellular towers, adding cells, adding fiber links) and provide better QoE (e.g., higher network speed, less network traffic, less network latency) to end users of the networks. The system may reduce the operating expense (OPEX) (e.g., via reducing the complaints, tickets, lowering the network optimization cost), reduce the CAPEX (e.g., via most effectively pinpoint out where to add more cells and avoid adding cells in non-needed places), and recover or boost the traffic volume which would have been suppressed due to unsatisfied QoE.

Example Method

Figure 7:
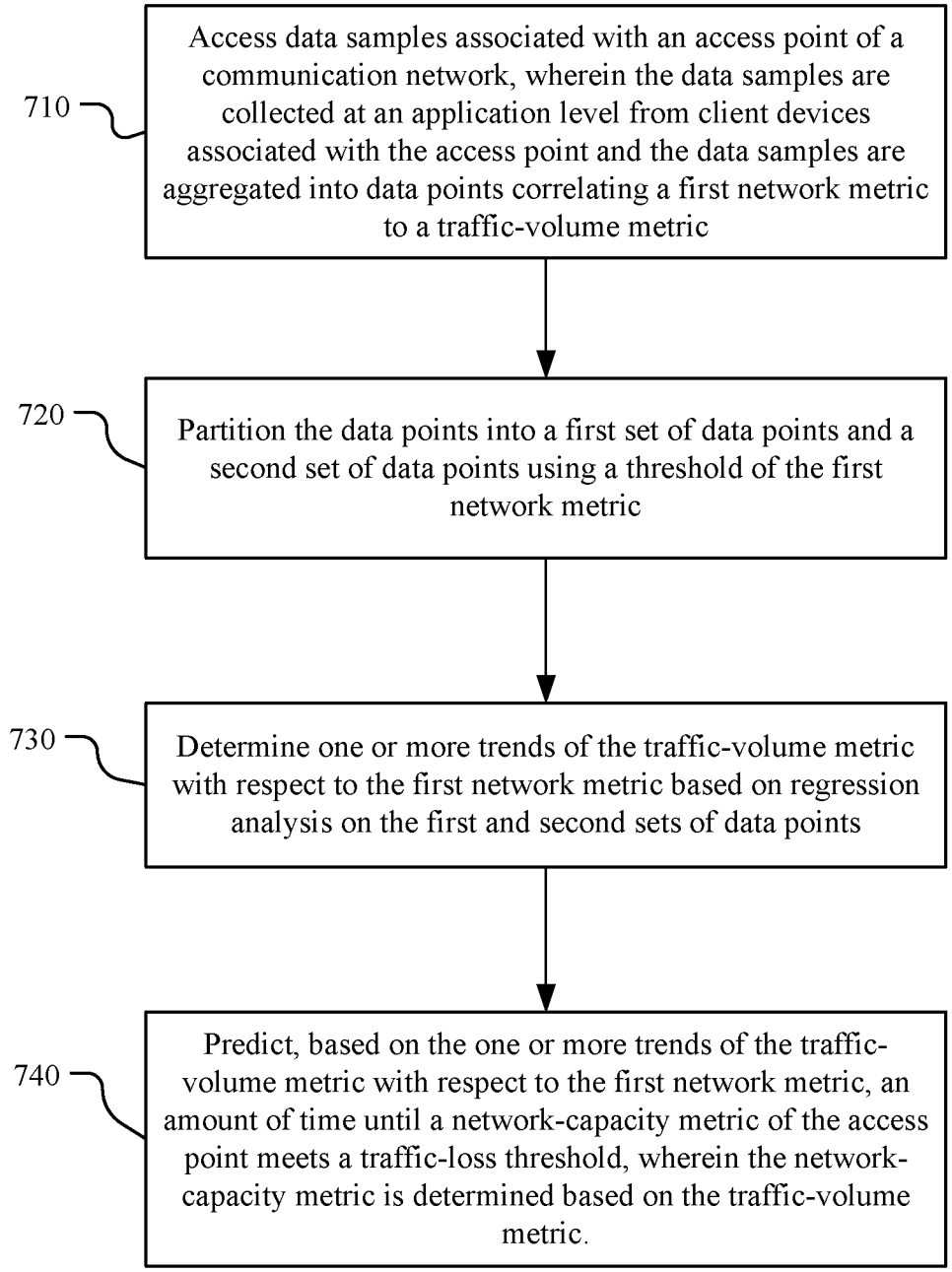
FIG. 7 illustrates an example method of predicting an amount of time until an access point is out of capacity.

FIG. 7 illustrates an example method 700 of predicting an amount of time until an access point is out of capacity. The method may begin at step 710, where one or more computing systems may access data samples associated with an access point of a communication network. The data samples may be collected at an application level from client devices associated with the access point. The data samples may be aggregated into a number of data points correlating a first network metric to a traffic-volume metric. At step 720, the system may partition the data points into a first set of data points and a second set of data points using a threshold of the first network metric. At step 730, the system may determine one or more trends of the traffic-volume metric with respect to the first network metric based on regression analysis on the first and second sets of data points. At step 740, the system may predict, based on the one or more trends of the traffic-volume metric with respect to the first network metric, an amount of time until a network-capacity metric of the access point meets a traffic-loss threshold. The network-capacity metric may be determined based on the traffic-volume metric.

In particular embodiments, the accessed data samples may be collected during a first time window of interest and aggregated into the data points per hour per week with each data point corresponding to one hour aggregated over one week. In particular embodiments, the first network metric may be number of samples each corresponding to a recorded network connecting request received from one of the client devices associated with the access point. The traffic-volume metric may be total network traffic volume aggregated per hour per week. In particular embodiments, the network-capacity metric may be a total network traffic loss percentage of a total network traffic volume over a second time window of interest. In particular embodiments, the one or more trends of the traffic-volume metric may include a first trend of the traffic-volume metric with respect to the number of samples determined based on a first regression on the first set of data points and a second trend of the traffic-volume metric with respect to the number of samples determined based on a second regression on the second set of data points. In particular embodiments, the total network traffic loss percentage may be determined by comparing a first total network traffic volume of the access point to a second total network traffic volume of the access point.

In particular embodiments, the first total network traffic volume of the access point may be determined based on the first trend of the network traffic assuming that unsuppressed network traffic of the access point follows the first trend of the network traffic. In particular embodiments, the first total network of the access point may correspond to the second time window of interest ending at a current or future time when the access point have the total network traffic loss percentage meet the traffic-loss threshold. In particular embodiments, the second total network traffic volume of the access point may be determined based on the data points including observation data of the access point. In particular embodiments, the second total network traffic volume of the access point may correspond to the first time window of interest during which the data samples are collected. In particular embodiments, the second total network traffic volume of the access point may be determined based on the first trend and the second trend of the traffic-volume metric with respect to the number of samples as determined by respective regression functions. In particular embodiments, the second total network traffic volume of the access point may correspond to a third time window of interest ending at a current or future time when the access point have the total network traffic loss percentage meet the traffic-loss threshold.

In particular embodiments, the system may determine an increasing percentage of the number of samples. The increasing percentage of the number of samples may cause the access point to have the total network traffic loss to meet the traffic-loss threshold. In particular embodiments, the system may determine a mid- or long-term trend of the number of samples over time based on historical data of the access point over a mid- or long-term time window using regression analysis. The system may determine an increasing speed of the number of samples over time based on the mid- or long-term trend of the number of samples over time. In particular embodiments, the amount of time until the access point has the network-capacity metric meet the traffic-loss threshold may be determined based on the increasing percentage of the number samples and the increasing speed of the number of samples. In particular embodiments, the amount of time until the access point has the network-capacity metric meet the traffic-loss threshold may be determined based on an average of a number of values of the amount of time. Each value of the amount of time may be determined based on a combination of a different threshold value for splitting the plurality of data points and a different time window duration during which the data samples are collected. In particular embodiments, the system may determine a priority score for the access point based at least on the amount of time until the access point has the network-capacity metric meet the traffic-loss threshold. The system may generate one or more network optimization recommendations for the access point based at least on the priority score of the access point. In particular embodiments, the system may optimize the access point based on the one or more network optimization recommendations. The access point once optimized may have improved network capacity Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for predicting an amount of time until an access point is out of capacity including the particular steps of the method of FIG. 7, this disclosure contemplates any suitable method for predicting an amount of time until an access point is out of capacity including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

System Overview

Figure 8:
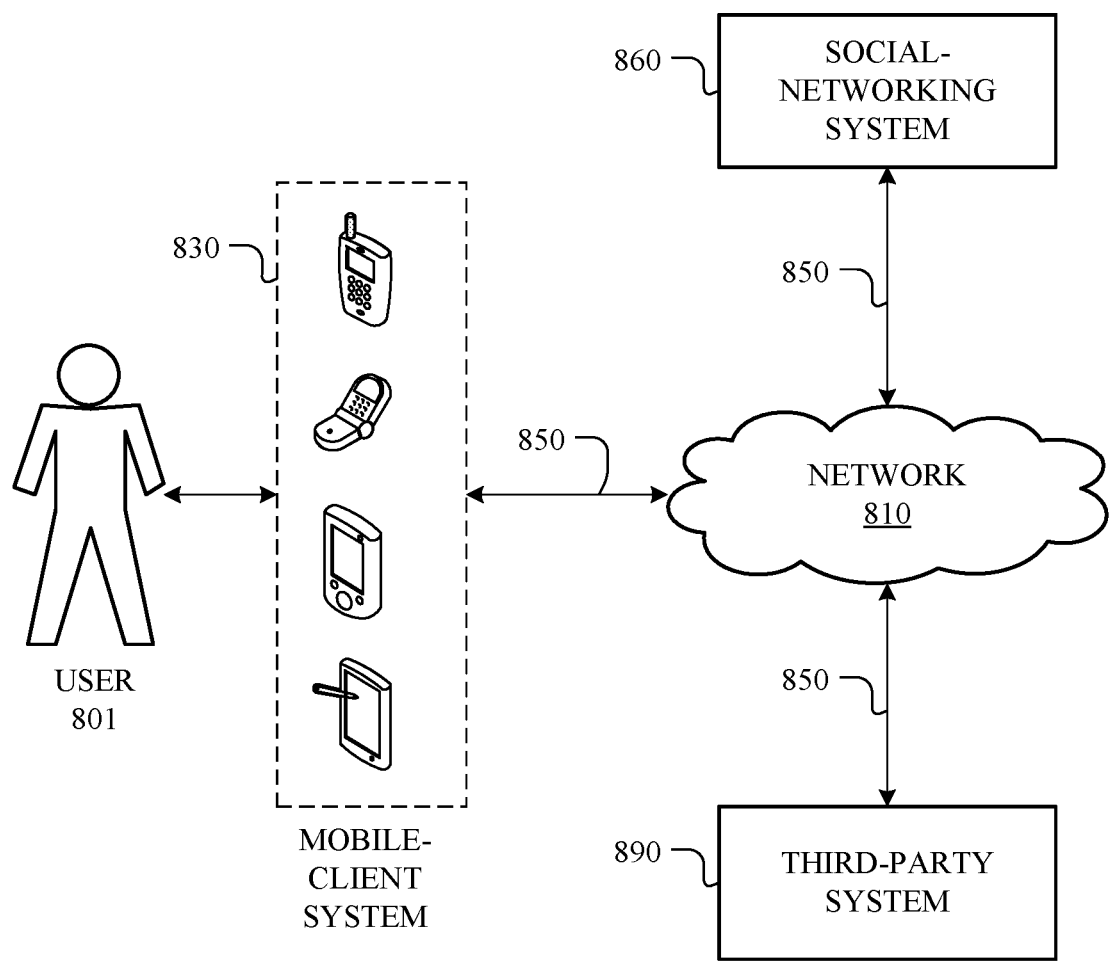
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node #04 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity)

for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
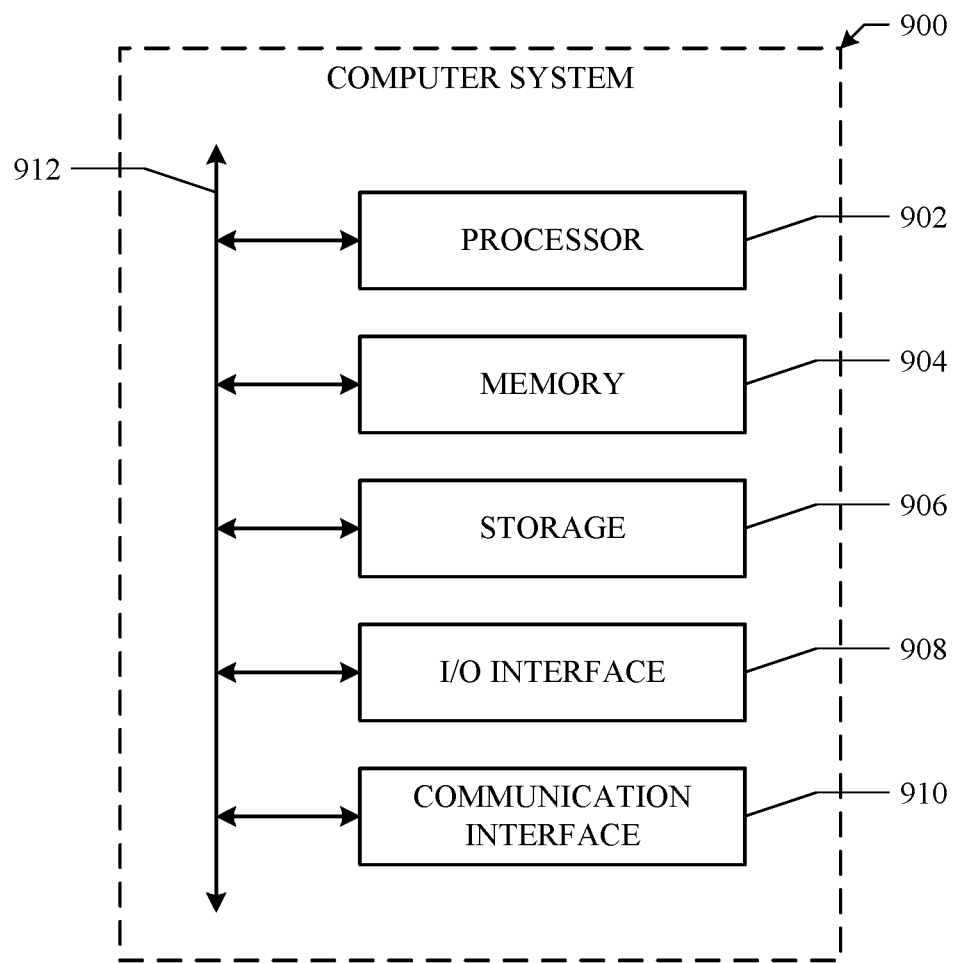
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   accessing data samples associated with an access point of a communication network, wherein the data samples are collected at an application level from client devices associated with the access point, and wherein the data samples are aggregated into a plurality of data points correlating a first network metric to a traffic-volume metric;
   partitioning the plurality of data points into a first set of data points and a second set of data points using a threshold of the first network metric;
   determining one or more trends of the traffic-volume metric with respect to the first network metric based on regression analysis on the first and second sets of data points; and
   predicting, based on the one or more trends of the traffic-volume metric with respect to the first network metric, an amount of time until a network-capacity metric of the access point meets a traffic-loss threshold, wherein the network-capacity metric is determined based on the traffic-volume metric.

2. The method of claim 1, wherein the accessed data samples are collected during a first time window of interest, and wherein the data samples are aggregated into the plurality of data points per hour per week with each data point corresponding to one hour aggregated over one week.

3. The method of claim 2, wherein the first network metric is a number of samples each corresponding to a recorded network connecting request received from one of the client devices associated with the access point, and wherein the traffic-volume metric is a total network traffic volume aggregated per hour per week.

4. The method of claim 3, wherein the network-capacity metric is a total network traffic loss percentage of the total network traffic volume over a second time window of interest.

5. The method of claim 4, wherein the one or more trends comprise a first trend of the traffic-volume metric with respect to the number of samples determined based on a first regression on the first set of data points and a second trend of the traffic-volume metric with respect to the number of samples determined based on a second regression on the second set of data points.

6. The method of claim 5, wherein the total network traffic loss percentage is determined by comparing a first total network traffic volume of the access point to a second total network traffic volume of the access point.

7. The method of claim 6, wherein the first total network traffic volume of the access point is determined based on the first trend of the traffic-volume metric assuming that the traffic-volume metric of the access point, if the access point is assumed to be upgraded, follows the first trend of the traffic-volume metric.

8. The method of claim 6, wherein the first total network traffic volume of the access point corresponds to the second time window of interest ending at a current or future time.

9. The method of claim 6, wherein the second total network traffic volume of the access point is determined based on the plurality of data points comprising observation data of the access point, and wherein the second total network traffic volume of the access point corresponds to the first time window of interest during which the data samples are collected.

10. The method of claim 6, wherein the second total network traffic volume of the access point is determined based on the first trend and the second trend of the traffic-volume metric with respect to the number of samples as determined by respective regression functions.

11. The method of claim 10, wherein the second total network traffic volume of the access point corresponds to a third time window of interest ending at a future time when the access point has the total network traffic loss percentage meet the traffic-loss threshold.

12. The method of claim 6, further comprising:
    determining an increasing percentage of the number of samples, wherein the increasing percentage of the number of samples causes the access point to have the total network traffic loss to meet the traffic-loss threshold.

13. The method of claim 12, further comprising:
    determining a mid- or long-term trend of the number of samples over time based on historical data of the access point over a mid- or long-term time window using regression analysis; and
    determining an increasing speed of the number of samples over time based on the mid- or long-term trend of the number of samples over time.

14. The method of claim 13, wherein the amount of time until the access point has the network-capacity metric meet the traffic-loss threshold is determined based on the increasing percentage of the number samples and the increasing speed of the number of samples.

15. The method of claim 1, wherein the amount of time until the access point has the network-capacity metric meet the traffic-loss threshold is determined based on a relationship between a plurality of numbers of weeks from a current time to a future time and a plurality of traffic-loss percentages corresponding to the plurality of numbers of weeks from the current time to the future time, and wherein the relationship is determined by a regression function.

16. The method of claim 1, wherein the amount of time until the access point has the network-capacity metric meet the traffic-loss threshold is determined based on an average of a plurality of values of the amount of time, and wherein each value of the amount of time is determined based on a combination of a different threshold value for splitting the plurality of data points and a different time window duration during which the data samples are collected.

17. The method of claim 1, further comprising:
- determining a priority score for the access point based at least on the amount of time until the access point has the network-capacity metric meet the traffic-loss threshold; and
- generating one or more network optimization recommendations for the access point based at least on the determined priority score of the access point.

18. The method of claim 17, further comprising:
- optimizing the access point based on the one or more network optimization recommendations, wherein the access point once optimized has improved network capacity.

19. One or more computer-readable non-transitory storage media embodying software that is operable, by a computing system comprising one or more processors, when executed to:
- access data samples associated with an access point of a communication network, wherein the data samples are collected at an application level from client devices associated with the access point, and wherein the data samples are aggregated into a plurality of data points correlating a first network metric to a traffic-volume metric;
- partition the plurality of data points into a first set of data points and a second set of data points using a threshold of the first network metric;
- determine one or more trends of the traffic-volume metric with respect to the first network metric based on regression analysis on the first and second sets of data points; and
- predict, based on the one or more trends of the traffic-volume metric with respect to the first network metric, an amount of time until a network-capacity metric of the access point meets a traffic-loss threshold, wherein the network-capacity metric is determined based on the traffic-volume metric.

20. A system comprising: one or more non-transitory computer-readable storage media embodying instructions; and one or more processors coupled to the storage media and operable to execute the instructions to:
- access data samples associated with an access point of a communication network, wherein the data samples are collected at an application level from client devices associated with the access point, and wherein the data samples are aggregated into a plurality of data points correlating a first network metric to a traffic-volume metric;
- partition the plurality of data points into a first set of data points and a second set of data points using a threshold of the first network metric;
- determine one or more trends of the traffic-volume metric with respect to the first network metric based on regression analysis on the first and second sets of data points; and
- predict, based on the one or more trends of the traffic-volume metric with respect to the first network metric, an amount of time until a network-capacity metric of the access point meets a traffic-loss threshold, wherein the network-capacity metric is determined based on the traffic-volume metric.

\* \* \* \* \*